(12) United States Patent
Scalisi

(10) Patent No.: US 9,053,622 B2
(45) Date of Patent: Jun. 9, 2015

(54) LIGHT SOCKET CAMERAS

(71) Applicant: Joseph Frank Scalisi, Yorba Linda, CA (US)

(72) Inventor: Joseph Frank Scalisi, Yorba Linda, CA (US)

(*) Notice: Subject to any disclaimer, the term of this patent is extended or adjusted under 35 U.S.C. 154(b) by 0 days.

(21) Appl. No.: 14/549,545

(22) Filed: Nov. 21, 2014

(65) Prior Publication Data

US 2015/0077567 A1  Mar. 19, 2015

Related U.S. Application Data

(63) Continuation-in-part of application No. 14/469,583, filed on Aug. 27, 2014, now Pat. No. 8,947,530, and a continuation-in-part of application No. 14/099,888, filed on Dec. 6, 2013, now Pat. No. 8,823,795, and a continuation-in-part of application No. 14/142,839, (Continued)

(51) Int. Cl.
  *H04N 7/18* (2006.01)
  *H04N 9/47* (2006.01)
  *G08B 13/196* (2006.01)

(52) U.S. Cl.
  CPC .... *G08B 13/19619* (2013.01); *G08B 13/19697* (2013.01); *H04N 7/183* (2013.01); *G08B 13/19658* (2013.01); *G08B 13/19636* (2013.01)

(58) Field of Classification Search
  CPC .......... H04L 12/2803; H04L 2012/2841; H04N 7/186; H04W 24/00; G08B 13/00; G08B 21/02; G05B 2219/2642; G06K 9/00201; G06K 9/00362

USPC .................................................. 348/140, 143
See application file for complete search history.

(56) References Cited

U.S. PATENT DOCUMENTS

| | | | |
|---|---|---|---|
| 1,994,056 A | 3/1935 | Trompeter |
| 5,428,388 A | 6/1995 | Von Bauer |
| 5,784,446 A | 7/1998 | Stuart |
| 6,073,192 A | 6/2000 | Clapp |
| 6,094,213 A | 7/2000 | Mun |
| 6,226,031 B1 | 5/2001 | Barraclough |
| 6,429,893 B1 | 8/2002 | Xin |
| 6,528,954 B1 | 3/2003 | Lys |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |

(Continued)

FOREIGN PATENT DOCUMENTS

| CN | 1902609 B | 5/2010 |
|---|---|---|
| CN | 202872976 U | 4/2013 |

(Continued)

OTHER PUBLICATIONS

August Smart Lock—Part 1—downloaded on Jun. 10, 2014 from www.August.com.

(Continued)

*Primary Examiner* — Andy Rao
*Assistant Examiner* — Jared Walker

(57) ABSTRACT

A security system can be used to detect adverse sounds. The security system can comprise a light socket camera that can be rotatably attached to a light socket of a building. The light socket camera can be used to detect the adverse sound, and in response to detecting the adverse sound, the light socket camera can notify a party, such as an emergency dispatcher.

23 Claims, 37 Drawing Sheets

Related U.S. Application Data filed on Dec. 28, 2013, now Pat. No. 8,842,180, application No. 14/549,545, which is a continuation-in-part of application No. 14/275,811, filed on May 12, 2014, now Pat. No. 8,872,915, which is a continuation-in-part of application No. 14/098,772, filed on Dec. 6, 2013, now Pat. No. 8,780,201, application No. 14/549,545, which is a continuation-in-part of application No. 14/463,548, filed on Aug. 19, 2014, now Pat. No. 8,941,736, and a continuation-in-part of application No. 14/534,588, filed on Nov. 6, 2014.

(60) Provisional application No. 61/872,439, filed on Aug. 30, 2013, provisional application No. 61/859,070, filed on Jul. 26, 2013, provisional application No. 62/039,394, filed on Aug. 19, 2014, provisional application No. 62/018,605, filed on Jun. 29, 2014.

(56) References Cited

U.S. PATENT DOCUMENTS

| | | | |
|---|---|---|---|
| 7,015,943 | B2 | 3/2006 | Chiang |
| 7,193,644 | B2 | 3/2007 | Carter |
| 7,429,924 | B2 | 9/2008 | Langer et al. |
| 7,477,134 | B2 | 1/2009 | Langer et al. |
| 7,492,303 | B1 | 2/2009 | Levitan |
| 7,583,191 | B2 | 9/2009 | Zinser |
| 7,738,917 | B2 | 6/2010 | Ryley |
| 7,746,223 | B2 | 6/2010 | Howarter |
| 7,752,070 | B2 | 7/2010 | Hatcher |
| 8,016,676 | B2 | 9/2011 | Carter |
| 8,139,098 | B2 | 3/2012 | Carter |
| 8,144,183 | B2 | 3/2012 | Carter |
| 8,144,184 | B2 | 3/2012 | Carter |
| 8,154,581 | B2 | 4/2012 | Carter |
| 8,164,614 | B2 | 4/2012 | Carter |
| 8,193,919 | B2 | 6/2012 | Langer |
| 8,504,103 | B2 | 8/2013 | Ficquette |
| 8,562,158 | B2* | 10/2013 | Chien ............................... 362/3 |
| 8,565,399 | B2 | 10/2013 | Siminoff |
| 8,780,201 | B1 | 7/2014 | Scalisi |
| 8,823,795 | B1 | 9/2014 | Scalisi |
| 8,842,180 | B1 | 9/2014 | Scalisi |
| 2003/0197807 | A1 | 10/2003 | Wu |
| 2004/0085205 | A1 | 5/2004 | Yeh |
| 2004/0086093 | A1 | 5/2004 | Schranz |
| 2004/0229569 | A1 | 11/2004 | Franz |
| 2005/0057361 | A1* | 3/2005 | Giraldo et al. ............. 340/573.1 |
| 2005/0097248 | A1 | 5/2005 | Kelley |
| 2005/0285944 | A1 | 12/2005 | Watanabe |
| 2006/0156361 | A1 | 7/2006 | Wang |
| 2006/0271678 | A1 | 11/2006 | Jessup |
| 2007/0126574 | A1 | 6/2007 | Langer |
| 2007/0194945 | A1 | 8/2007 | Atkinson |
| 2007/0237358 | A1* | 10/2007 | Tseng et al. .................. 382/103 |
| 2008/0036862 | A1 | 2/2008 | Lang |
| 2008/0297339 | A1 | 12/2008 | Mathews et al. |
| 2009/0072963 | A1 | 3/2009 | Langer |
| 2009/0141939 | A1 | 6/2009 | Chambers |
| 2009/0284578 | A1 | 11/2009 | Carter |
| 2010/0087161 | A1 | 4/2010 | Young |
| 2010/0195810 | A1 | 8/2010 | Mota |
| 2012/0113253 | A1 | 5/2012 | Slater |
| 2012/0127308 | A1* | 5/2012 | Eldershaw et al. ........... 348/143 |
| 2012/0162416 | A1 | 6/2012 | Su |
| 2012/0262581 | A1 | 10/2012 | Carter |
| 2012/0280783 | A1 | 11/2012 | Gerhardt et al. |
| 2012/0280789 | A1 | 11/2012 | Gerhardt |
| 2012/0280790 | A1 | 11/2012 | Gerhardt |
| 2013/0039499 | A1* | 2/2013 | Patenaude et al. .............. 381/56 |
| 2013/0045763 | A1 | 2/2013 | Ruiz |
| 2013/0050495 | A1 | 2/2013 | Chen |
| 2013/0057695 | A1 | 3/2013 | Huisking |
| 2013/0094444 | A1 | 4/2013 | Lai |
| 2013/0130749 | A1 | 5/2013 | Andersen |
| 2013/0169814 | A1 | 7/2013 | Liu |
| 2014/0203939 | A1 | 7/2014 | Harrington |
| 2014/0273892 | A1 | 9/2014 | Nourbakhsh |
| 2014/0368643 | A1* | 12/2014 | Siegel et al. .................. 348/143 |

FOREIGN PATENT DOCUMENTS

| | | |
|---|---|---|
| CN | 202939738 U | 5/2013 |
| EP | 684743 B1 | 7/1999 |
| GB | 2400958 | 12/2005 |
| WO | WO 01/93220 A1 | 12/2001 |

OTHER PUBLICATIONS

August Smart Lock—Part 2—downloaded on Jun. 10, 2014 from www.August.com.
August Smart Lock—Part 3—downloaded on Oct. 10, 2014 from www.August.com.
Kevo Lock—User guide—downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—downloaded on Oct. 10, 2014 from http://s7d5.scene7.com/is/content/BDHHI/Kwikset/Website%20Content/Kevo/installation_guide.pdf.
Schlage Electronic Lock—User guide—downloaded on Jun. 10, 2014 from www.schlage.com.
Lock-Style Solenoid—Downloaded on Aug. 22, 2014 from www.AdaFruit.com.
Power Matters Alliance—Downloaded on Aug. 23, 2014 from www.wikipedia.com.
Push-Pull Solenoid—Downloaded on Aug. 22, 2014 from www.AdaFruit.com.
Push-Pull Solenoid—Technical Details—Downloaded on Aug. 22, 2014 from www.AdaFruit.com.
Qi—Downloaded on Aug. 23, 2014 from www.wikipedia.com.
TP-Link—Website—Downloaded on Jul. 15, 2014 from www.tp-link.us.
TP-Link—User guide—downloaded on Jul. 15, 2014 from www.tp-link.us.
AC Adapter Spy Camera—Downloaded on Jun. 24, 2014 from ahdcameras.com.
FanFare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
Amazon.com Listing: "Philips InSight Wireless HD Baby Monitor," downloaded Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips+insight+wi-fi+baby+monitor.
Cellnock.com Listing: "CellNock," downloaded Sep. 23, 2013 from http://cellnock.com/products.htm.
Cellnock.com Listing: "CellNock Index," downloaded Sep. 23, 2013 from http://cellnock.com/index.html.
Christiestreet.com Listing: "DoorBot," downloaded Jun. 14, 2013 from https://christiestreet.com/products/doorbot.
Idoorcam.com: "iDoorCam—A Wi-Fi Enabled, Webcam Doorbell," downloaded Sep. 3, 2013 from http://www.idoorcam.com/.
Indiegogo.com Listing: "Squaritz IDS—Intelligent Doorbell System," originally downloaded Aug. 15, 2013 from http://www.indiegogo.com/projects/squaritz-ids-intelligent-doorbell-system.
Indiegogo.com Listing: "wireless video doorbell pager," downloaded Aug. 9, 2013 from http://www.indiegogo.com/projects/wireless-video-doorbell-pager--4.
Lockitron.com Listing: "Lockitron," downloaded Jul. 24, 2013 from https://lockitron.com/preorder.

(56) References Cited

OTHER PUBLICATIONS

Revolutionary Concepts, Inc. Listing: "Eyetalk for Home," originally downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
Doorbot: Downloaded on Nov. 18, 2013 from http://www.craigncompany.com/home-tech-doorbot/; prior art publication at least as of Jun. 10, 2013.
Doorbot: Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.
Doorbot: Downloaded on Nov. 18, 2013 from http://www.digitaltrends.com/lifestyle/doorbot-camera-see-visitors-smartphone/; prior art publication at least as of Dec. 9, 2012.
Doorbot website: Downloaded on Nov. 18, 2013 from http://www.getdoorbot.com/.
Doorbot users manual: Downloaded on Nov. 18, 2013 from http://static.mydoorbot.com/DoorBot%20Users%20Manual%201.0.pdf.
Doorbo "fact sheet": Downloaded on Nov. 18, 2013 from http://cdn.shopify.com/s/files/1/0247/6501/files/DoorBotMediaKit.pdf?17037.
Doorbot "features kit": Downloaded on Nov. 18, 2013 from http://cdn.shopify.com/s/files/1/0247/6501/files/DoorBot_Features_Kit.pdf?17037.
CellNock index page: Originally downloaded on Sep. 23, 2013 from http://cellnock.com/index.html; The website says CellNock is "patent pending."
CellNock about founder page: Downloaded on Nov. 18, 2013 from http://cellnock.com/index.html; The website says CellNock is "patent pending."
CellNock learn more page: Downloaded on Nov. 18, 2013 from http://cellnock.com/learn_more.htm; The website says CellNock is "patent pending."
CellNock product page: Downloaded on Nov. 18, 2013 from http://cellnock.com/products.htm; The website says CellNock is "patent pending."
Philips InSight Baby Monitor: Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
MySkyBell.com—Part 1 (previously iDoorCam.com): Downloaded on Nov. 18, 2013 from http://www.myskybell.com/.
MySkyBell.com—Part 2 (previously iDoorCam.com): Downloaded on Nov. 18, 2013 from http://www.myskybell.com/.
MySkyBell.com—Part 3 (previously iDoorCam.com): Downloaded on Nov. 18, 2013 from http://www.myskybell.com/.
MySkyBell.com—Part 4 (previously iDoorCam.com): Downloaded on Nov. 18, 2013 from http://www.myskybell.com/.
MySkyBell.com—Part 5 (previously iDoorCam.com): Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.
Wireless video doorbell pager—Downloaded on Aug. 9, 2013 from http://www.indiegogo.com/projects/wireless-video-doorbell-pager--4.
Lockitron—Downloaded on Jul. 24, 2013 from https://lockitron.com/preorder.
EyeTalk for home—Downloaded on May 2013 from http://www.revolutionaryconceptsinc.com/forhome.html.
EyeTalk Product—Downloaded on Nov. 18, 2013 from http://www.revolutionaryconceptsinc.com/eyetalk.html.
Langer Doorbell Light—Downloaded on Nov. 18, 2013 from http://www.youtube.com/watch?v=u9nNCm4tSYI; published at least as early as Apr. 2013.
SmartBell—Downloaded on Dec. 5, 2013 from http://smartbell.co/This_is_smartbell.html.
SmartBell—Downloaded on Dec. 5, 2013 from http://smartbell.co/Tech_specs.html.
SmartBell—Downloaded on Dec. 5, 2013 from http://smartbell.co/FAQ.html.
SmartBel—A Doorbell for Smartphones, published by Scrambled Brains Tech, LLC., Oct. 1, 2013.

* cited by examiner

LIGHT SOCKET CAMERAS

CROSS-REFERENCE TO RELATED APPLICATIONS

This application claims the benefit of and is a continuation-in-part of U.S. Nonprovisional patent application Ser. No. 14/469,583; filed Aug. 27, 2014; and entitled SMART LOCK SYSTEMS AND METHODS; the entire contents of which are incorporated herein by reference. U.S. Nonprovisional patent application Ser. No. 14/469,583 claims the benefit of U.S. Provisional Patent Application No. 61/872,439; filed Aug. 30, 2013; and entitled DOORBELL COMMUNICATION SYSTEMS AND METHODS; the entire contents of which are incorporated herein by reference. U.S. Nonprovisional patent application Ser. No. 14/469,583 claims the benefit of and is a continuation-in-part of U.S. Nonprovisional patent application Ser. No. 14/099,888; filed Dec. 6, 2013; and entitled DOORBELL COMMUNICATION SYSTEMS AND METHODS, which issued as U.S. Pat. No. 8,823,795 on Sep. 2, 2014; the entire contents of which are incorporated herein by reference. U.S. Nonprovisional patent application Ser. No. 14/469,583 claims the benefit of and is a continuation-in-part of U.S. Nonprovisional patent application Ser. No. 14/142,839; filed Dec. 28, 2013; and entitled DOORBELL COMMUNICATION SYSTEMS AND METHODS, which issued as U.S. Pat. No. 8,842,180 on Sep. 23, 2014; the entire contents of which are incorporated herein by reference.

This application claims the benefit of and is a continuation-in-part of U.S. Nonprovisional patent application Ser. No. 14/275,811; filed May 12, 2014; and entitled DOORBELL COMMUNICATION SYSTEMS AND METHODS; the entire contents of which are incorporated herein by reference. U.S. Nonprovisional patent application Ser. No. 14/275,811 claims the benefit of and is a continuation-in-part of U.S. Nonprovisional patent application Ser. No. 14/098,772; filed Dec. 6, 2013; and entitled DOORBELL COMMUNICATION SYSTEMS AND METHODS, which issued as U.S. Pat. No. 8,780,201 on Jul. 15, 2014; the entire contents of which are incorporated herein by reference. U.S. Nonprovisional patent application Ser. No. 14/275,811 claims the benefit of U.S. Provisional Patent Application No. 61/859,070; filed Jul. 26, 2013; and entitled DOORBELL COMMUNICATION SYSTEMS AND METHODS; the entire contents of which are incorporated herein by reference.

This application claims the benefit of and is a continuation-in-part of U.S. Nonprovisional patent application Ser. No. 14/463,548; filed Aug. 19, 2014; and entitled DOORBELL COMMUNICATION SYSTEMS AND METHODS; the entire contents of which are incorporated herein by reference.

This application claims the benefit of U.S. Provisional Patent Application No. 62/039,394; filed Aug. 19, 2014; and entitled LIGHT SOCKET CAMERAS; and U.S. Provisional Patent Application No. 62/018,605; filed Jun. 29, 2014; and entitled LIGHT SOCKET CAMERAS; the entire contents of which are incorporated herein by reference.

This application claims the benefit of and is a continuation-in-part of U.S. Nonprovisional patent application Ser. No. 14/534,588; filed Nov. 6, 2014; and entitled LIGHT SOCKET CAMERAS; the entire contents of which are incorporated herein by reference.

BACKGROUND

1. Technical Field

Various embodiments disclosed herein relate to devices and methods that enable people to observe remote locations. Certain embodiments relate to using a computing device to see video taken by a remotely located camera.

2. Description of Related Art

Video cameras can record images of various events that are viewable by remotely located people. Additionally, video cameras can be supported by objects such as tripods. Furthermore, video cameras often require electrical power. Some video cameras receive electrical power from batteries and/or power outlets.

SUMMARY

The disclosure describes methods for detecting an adverse sound. The methods may include using a light socket camera to detect the adverse sound. The light socket camera may be coupled to a building. The light socket camera may also include an outer housing comprising a proximal end, a distal end that is opposite the proximal end, and a sidewall that extends between the proximal end and the distal end, a camera coupled to the outer housing, whereby the camera is configured to record a video, a speaker located within an internal portion of the outer housing, whereby the speaker is configured to transmit an audible sound, a microphone located within an internal portion of the outer housing, whereby the microphone is configured to receive an audible instruction, and a screw thread contact located adjacent the proximal end of the outer housing, whereby the screw thread contact is rotatably attached to a light socket of the building. In response to detecting the adverse sound, methods may also include using the light socket camera to notify a party.

In many embodiments the party is an emergency dispatcher. In some embodiments the party is a contact on a building user's contact list.

The adverse sound may be selected from the group consisting of a gunshot, shouting, screaming, and breaking glass.

In response to detecting the adverse sound, methods may further include using the camera of the light socket camera to record one of an audio and video of an area adjacent the light socket camera. Methods may further include transmitting one of the audio and video to a remote computing device.

In response to detecting the adverse sound, methods may further include using the speaker to sound an audible warning.

In response to detecting the adverse sound, methods may further include using the light socket camera to flash a warning light.

As well, in response to detecting the adverse sound, methods may further include using the light socket camera to determine a location of the adverse sound within the building. In response to determining the location of the adverse sound within the building, methods may further include transmitting a notification of the location of the adverse sound within the building to the party.

Methods may further include determining a type of the adverse sound. As well, methods may further include determining a time of day that the adverse sound was detected, and in response to determining the time of day of the adverse sound, the method may include transmitting a notification of the time of day to the party. Methods may also include receiving an audible message from the party and sounding, via the speaker of the light socket camera, the audible message to an area adjacent to the light socket camera.

The disclosure may also include a method for detecting an adverse sound. The method may include using a first light socket camera to detect a sound. The first light socket camera may be coupled to a building. The first light socket camera may include an outer housing comprising a proximal end, a distal end that is opposite the proximal end, and a sidewall that extends between the proximal end and the distal end, a camera coupled to the outer housing, whereby the camera is configured to record a video, a speaker located within an internal portion of the outer housing, whereby the speaker is configured to transmit an audible sound, a microphone located within an internal portion of the outer housing, whereby the microphone is configured to receive an audible instruction, and a screw thread contact located adjacent the proximal end of the outer housing, whereby the screw thread contact is rotatably attached to a light socket. In response to detecting the adverse sound, methods may further include using the first light socket camera to initiate an event at a second light socket camera communicatively coupled to the first light socket camera.

As well, methods may include using the second light socket camera to emit an audible message through a speaker of the second light socket camera and using the second light socket camera to flash a warning light of the second light socket camera.

In response to using the second light socket camera to emit an audible message and using the second light socket camera to flash the warning light, methods may further include using a motion detector of the second light socket camera to detect a motion of a user within an area of the second light socket camera.

In some methods the event may be a first event. In response to detecting no motion via the motion detector of the second light socket camera, methods may further include using the first light socket camera to initiate a second event at a third light socket camera communicatively coupled to the first light socket camera.

Methods may further include determining a type of adverse sound. As well, some methods may include using the second light socket camera to emit an audible message through the speaker of the second light socket camera. The audible message may include an identification of the type of the adverse sound.

Many methods may include determining whether the adverse sound is a first sound or a second sound. In response to determining the adverse sound is the first sound, methods may include using the first light socket camera to initiate a first event at the second light socket camera. In response to determining the adverse sound is the second sound, methods may include using the first light socket camera to initiate a second event at the second light socket camera. The second event may be different than the first event.

In some methods the first event may comprise flashing a warning light of the second light socket camera, and the second event may comprise sounding an audible alarm.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

System Embodiments

Communication systems can provide a secure and convenient way for a remotely located individual to see and/or communicate with a person who is within the field of vision of a camera and/or within the range of a microphone. Communication systems can include a camera that is attached to a light socket to couple the camera to a wall and to provide electricity to the camera.

Some communication systems can allow an individual to hear, see, and talk with visitors. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Specifically, example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Figure 1A:
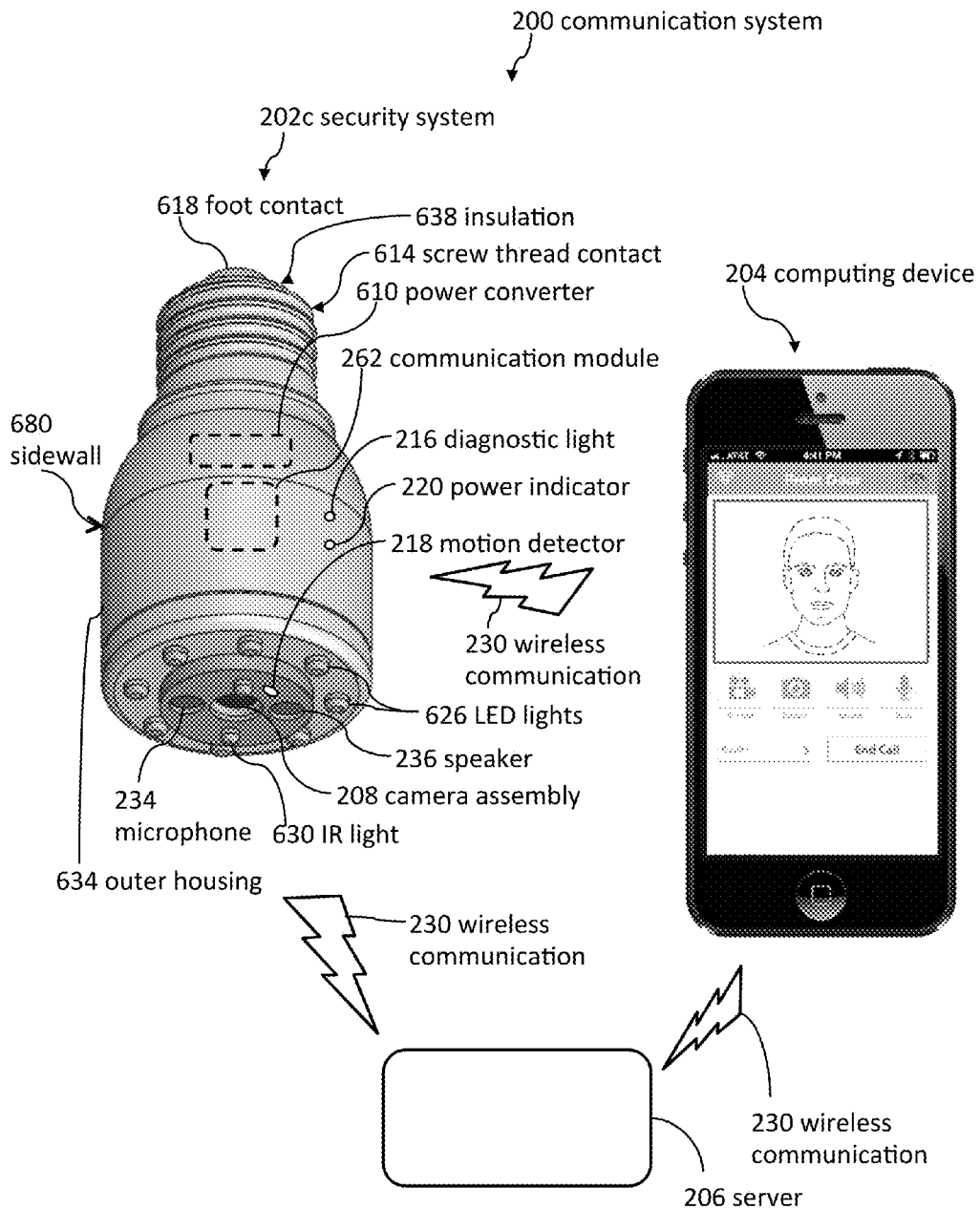
FIG. 1a illustrates a front view of a communication system, according to some embodiments.

Referring now to FIG. 1a, communication systems 200 can be a portion of a smart home hub. Communication systems 200 can facilitate home automation. In some cases, cameras 208 are electrically coupled to a light socket of a building 300 and are integrated into a holistic home automation system and/or home security system. Various systems described herein enable home surveillance and/or complete home automation. Cameras 208 threadably screwed into an interior light socket can enable a remote user to see events inside of a building 300 (shown in FIG. 3). As well, cameras 208 threadably screwed into exterior light sockets can enable a remote user to see events outside of a building 300.

In some embodiments, the security system 202c controls various electrical items in a home (e.g., lights, air conditioners, heaters, motion sensors, garage door openers, locks, televisions, computers, entertainment systems, appliances, pool monitors, elderly monitors, and the like). In some embodiments, the computing device 204 controls the security system 202c and other electrical items in a home (e.g., lights, air conditioners, heaters, motion sensors, garage door openers, locks, televisions, computers, entertainment systems, appliance, pool monitors, elderly monitors, and the like).

FIG. 1 illustrates a front view of a communication system embodiment. The communication system 200 can include a security system 202c (e.g., a camera assembly) and a computing device 204. Although the illustrated security system 202c includes many components in one housing, several security system embodiments include components in separate housings. The security system 202c can include a camera assembly 208. The camera assembly 208 can include a video camera, which in some embodiments is a webcam. The camera assembly 208 can be configured to take videos of a surrounding area for viewing via the Internet. However, it should be appreciated that the camera assembly 208 can be a still camera, any type of digital camera, virtual camera, and the like. Generally, it should be appreciated that the camera assembly 208 can be any type of camera or optical instrument that records images that can be stored directly, transmitted to another location, or both.

Figure 1B:
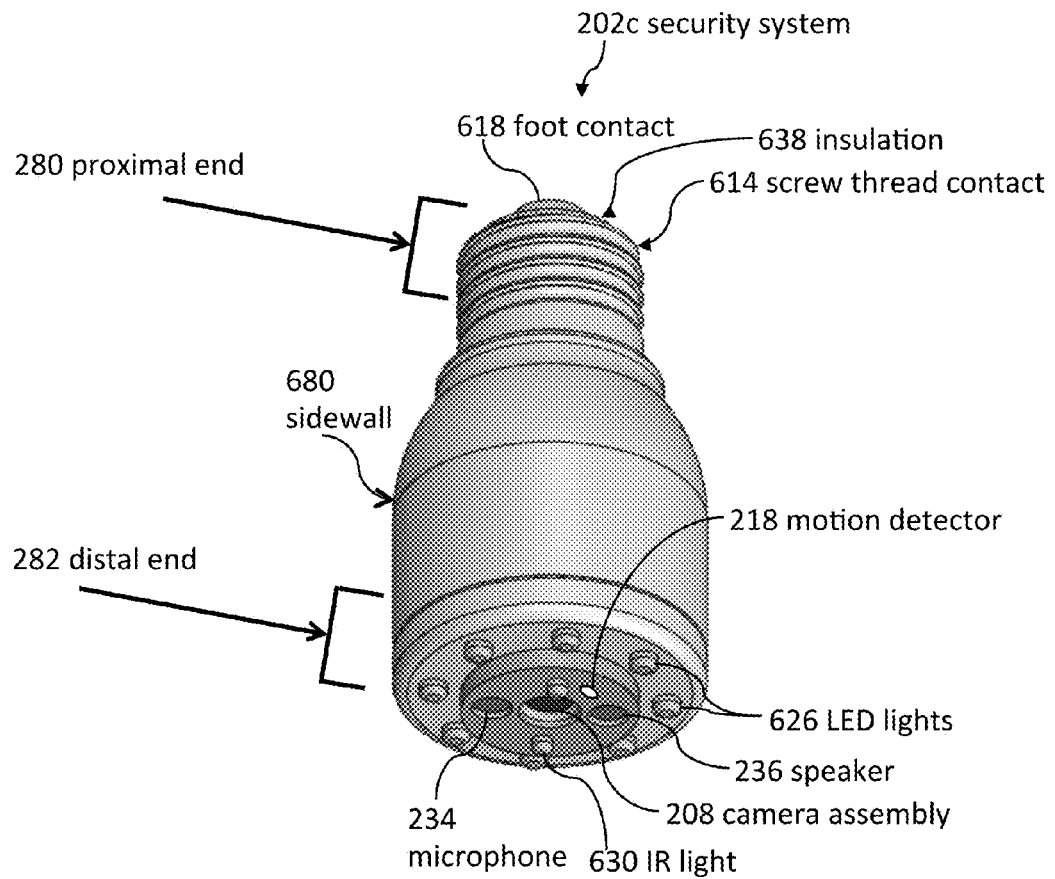
FIG. 1b illustrates a front view of a security system, according to some embodiments.

Now with added reference to FIG. 1b, the security system 202c can include a proximal end 280 and a distal end 282 that is opposite the proximal end 280. The camera assembly 208 can be located at the distal end 282 of the security system 202c. However, it should be appreciated that the camera assembly 208 can be positioned at any location on the security system 202c, such as the sidewall 680. The security system 202c can also include a foot contact 618 located at the proximal end 280 of the security system 202c.

It should be appreciated that the security system 202c can include more than one camera assembly 208. For example, the security system 202c may include two cameras. In some embodiments, the security system 202c includes a first camera disposed at the distal end 282 of the security system 202c, and a second camera disposed along the sidewall 680 of the security system 202c. In this manner the second camera may face perpendicular to the direction the first camera is facing. This may allow the security system 202c to have a larger field of vision of the area to which the security system 202c is monitoring.

Moreover, the security system 202c can also include a third camera, a fourth camera, and a fifth camera. The cameras can be mounted at any location along the security system 202c to thereby expand the field of vision of the security system 202c. As well, the camera(s) 208 may be configured to move away from the security system 202c and pivot along at least two axes. The movement of the camera(s) 208 may be controlled via manual manipulation by a person, a command from a remote computing device 204, automatically in response to the occurrence of an event, or the like.

As shown in FIG. 1a, the security system 202c can include a diagnostic light 216 and a power indicator light 220. In some embodiments, the diagnostic light 216 is a first color (e.g., blue) if the security system 202c and/or the communication system 200 is connected to a wireless Internet network and is a second color (e.g., red) if the security system 202c and/or the communication system 200 is not connected to a wireless Internet network. In some embodiments, the power indicator 220 is a first color if the security system 202c is connected to a power source. The power source can be power supplied by the building 300 to which the security system 202c is attached. The security system 202c can receive electricity via the light socket to which the security system 202c is attached. In some embodiments, the power indicator 220 is a second color or does not emit light if the security system 202c is not connected to the power source.

The security system 202c (e.g., a camera assembly) can include an outer housing 634, which can be water resistant and/or waterproof. The outer housing 634 can be made from metal or plastic, such as molded plastic with a hardness of 60 Shore D. In some embodiments, the outer housing 634 is made from brushed nickel or aluminum. The outer housing 634 can be rigid.

Rubber seals can be used to make the outer housing 634 water resistant or waterproof. The security system 202c can be electrically coupled to a power source, such as wires electrically connected to a building's electrical power system. In some embodiments, the security system 202c includes a battery for backup and/or primary power.

As shown in FIG. 1, the security system 202c can include a screw thread contact 614 having a proximal end adjacent the foot contact 618 and a distal end that is opposite the proximal end. The distal end of the screw thread contact 614 can be located adjacent the proximal end of the outer housing 634. The screw thread contact 614 can also include a threaded sidewall that extends between the proximal end and the distal end of the screw thread contact 614. In this manner, the threaded sidewall of the screw thread contact 614 can be configured to rotatably attach to the light socket 650.

The security system can include lights 626, which can be LED lights configured to illuminate a room and/or an outdoor area. In some embodiments, the lights 626 can provide at least 10 lumens, at least 1,000 lumens, at least 4,000 lumens, and/or less than 40,000 lumens. The lights 626 can be aligned such that the lights 626 are parallel to a central axis 266 of a screw thread contact 614. The lights 626 can be oriented such that they face away from the foot contact 618.

As well, the security system 202c can include lights 630, which can be infrared lights. The lights 630 can illuminate an area in front of the camera assembly's 208 field of vision to enable the camera assembly 208 to capture easily viewable and high-quality video. In this regard, the lights 630 can be located at the distal end 282 of the security system 202c, adjacent to the camera assembly 208. Infrared light can be suitable for nighttime video recording. In some embodiments the security system 202c includes a photosensor and/or a photodetector to determine whether the field of vision of the camera assembly 208 is illuminated. In response to determining that the field of vision is not illuminated, the security system 202c can illuminate the light and use the camera assembly 208 to record a video of the visitor. It should be appreciated that the security system 202c can include any type of sensor configured to determine an amount of light, such as a reverse-biased light emitting diode (LED), photovoltaic cell, photodiode, ultraviolet light sensor, and the like.

The lights 626 and 630 can be controlled by any number of means. For example, the security system 202c can be configured to receive a first instruction from the remote computing device 204. The first instruction can include a command to illuminate either or both of the lights 626 and/or 630. In response to receiving the first instruction from the remote computing device 204, the security system 202c can illuminate the lights 626 and/or 630. As well, the security system 202c can receive a second instruction from the remote computing device 204. The second instruction can include a command to de-activate the lights 626 and/or 630. Accordingly, in response to receiving the second instruction from the remote computing device 204, the security system 202c can de-activate the lights 626 and/or 630.

The security system 202c can also be configured to illuminate and de-activate the lights 626 and/or 630 in a number of different manners. For example, the security system 202c can be configured to receive an audible instruction via the microphone 234 of the security system 202c. The audible instruction can be a spoken command by the visitor to thereby illuminate and/or de-activate the lights 626 and/or 630. For example, the audible instruction can be the visitor saying, "Turn lights on," "Illuminate lights," "Lights off," "Dim lights," and the like. Generally, the audible instruction can be any spoken command or noise from the visitor, which is thereby received by the security system 202c to illuminate the lights. Accordingly, in response to receiving the audible instruction from the visitor, the security system 202c can illuminate or de-activate the lights 626 and/or 630.

As well, the security system 202c can include a communication module 262 configured to enable wireless communication with the computing device 204. The communication module 262 can include a WiFi antenna and can be configured to enable the security system 202c to connect to a wireless network 308 of a building 300 (shown in FIG. 3).

Wireless communication 230 can enable the security system 202c (e.g., a camera assembly) to communicate with the computing device 204. Accordingly, the security system 202c may include a communication module 262 located within an internal portion of the outer housing 634. The communication module 262 may be configured to connect to a wireless communication network. Some embodiments enable communication via cellular and/or WiFi networks. Some embodiments enable communication via the Internet. Several embodiments enable wired communication between the security system 202c and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202c can initiate voice calls or transmit text messages to a computing device 204 (e.g., a smartphone, a desktop computer, a tablet computer, a laptop computer).

Several embodiments use near field communication (NFC) to communicate between the computing device 204 and the security system 202c. The security system 202c and/or the computing device 204 can include a NFC tag. Some NFC technologies include Bluetooth, radio-frequency identification, and QR codes.

Several embodiments include wireless charging (e.g., near field charging, inductive charging) to supply power to and/or from the security system 202c and the computing device 204. Some embodiments use inductive charging (e.g., using an electromagnetic field to transfer energy between two objects).

Some embodiments include computer software (e.g., application software), which can be a mobile application designed to run on smartphones, tablet computers, and other mobile devices. Software of this nature is sometimes referred to as "app" software. In some embodiments the computer software includes software designed to run on desktop computers and laptop computers.

The computing device 204 can run software with a graphical user interface. The user interface can include icons or buttons. In some embodiments, the software is configured for use with a touch-screen computing device such as a smartphone or tablet.

The security system 202c can include a motion detector 218 configured to detect the presence of people (e.g., in the outdoor area or room in which the security system 202c is located) or objects. The security system 202c can also be placed outdoors to detect people or objects outside. The motion detector 218 can be an infrared motion detector.

Figure 3:
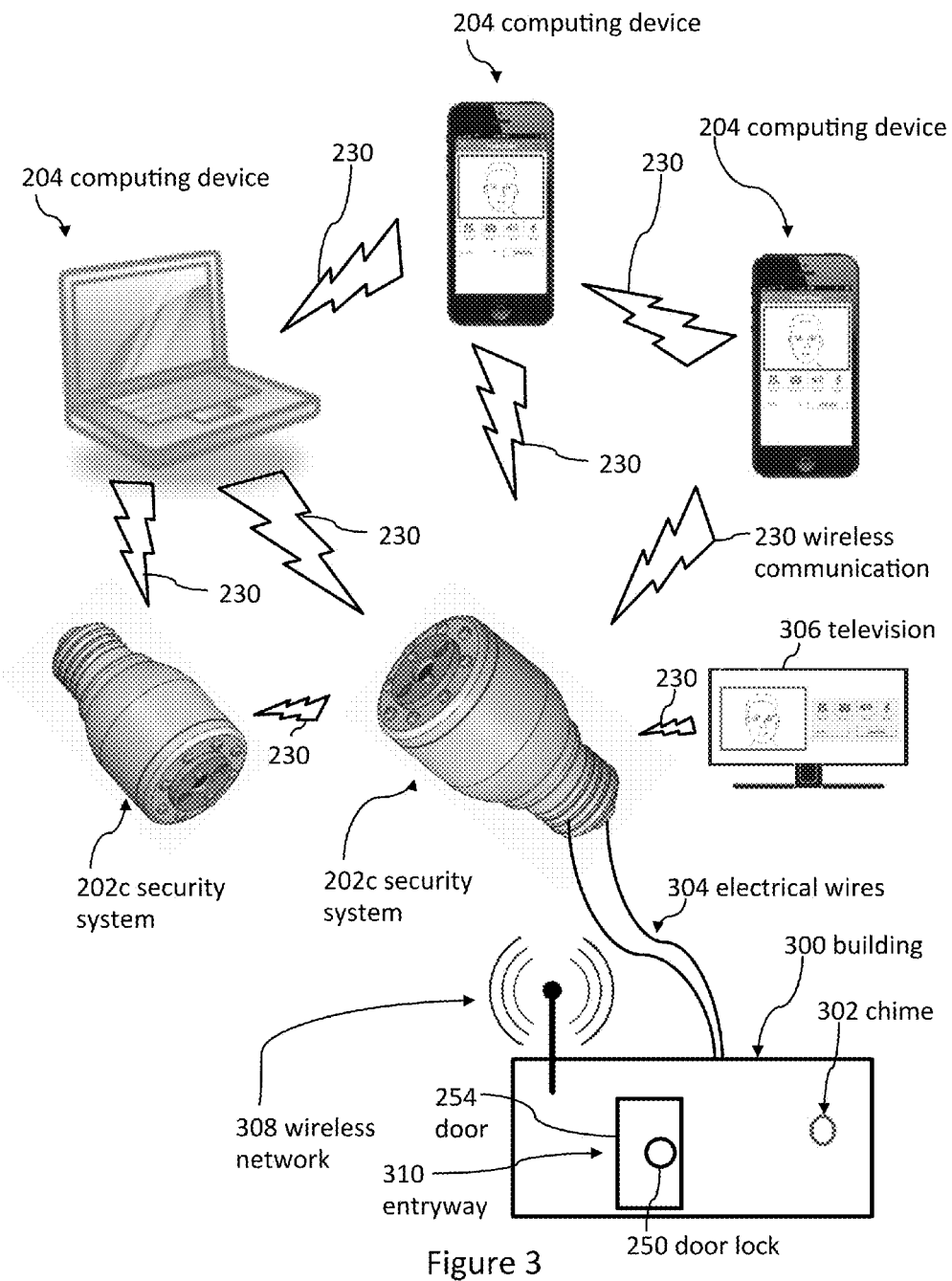
FIG. 3 illustrates an embodiment in which a security system is connected to a building, according to some embodiments.

As illustrated in FIGS. 6-10, the security system 202c can be attached to a light socket 650 to couple the security system 202c to an electrical power source (e.g., of a building 300 shown in FIG. 3). The security system 202c can include a screw thread electrical contact 614, which can comprise a conductive metal. The security system 202c can also include a foot electrical contact 618, which can comprise a conductive metal. The screw thread contact 614 can be electrically insulated from the foot electrical contact 618 by insulation 638.

The security system 202c can be coupled to the light socket 650 via any number of connection methods. For example, the screw thread contact 614 of the security system 202c can be rotatably attached to the light socket 650 to thereby couple the security system 202c to the light socket 650. When the security system 202c is coupled to the light socket 650, the foot contact 618 of the security system 202c can be electrically coupled to the foot contact 654 of the light socket 650, to thereby couple the security system 202c to the electrical power source (i.e. to energize the security system 202c).

A power converter 610 can be electrically coupled to the screw thread contact 614 and the foot contact 618. The power converter 610 can be configured to convert electricity from the building 300 (shown in FIG. 3) to a type of power that is more suitable for the security system 202c. In some embodiments, the power converter 610 converts an input voltage to a lower voltage and/or converts AC to DC power. Furthermore, it should be appreciated that the power converter 610 can be configured to adapt to the input voltages of any country, and thereby convert the input voltage to a voltage suited for the security system 202c.

Figure 2:
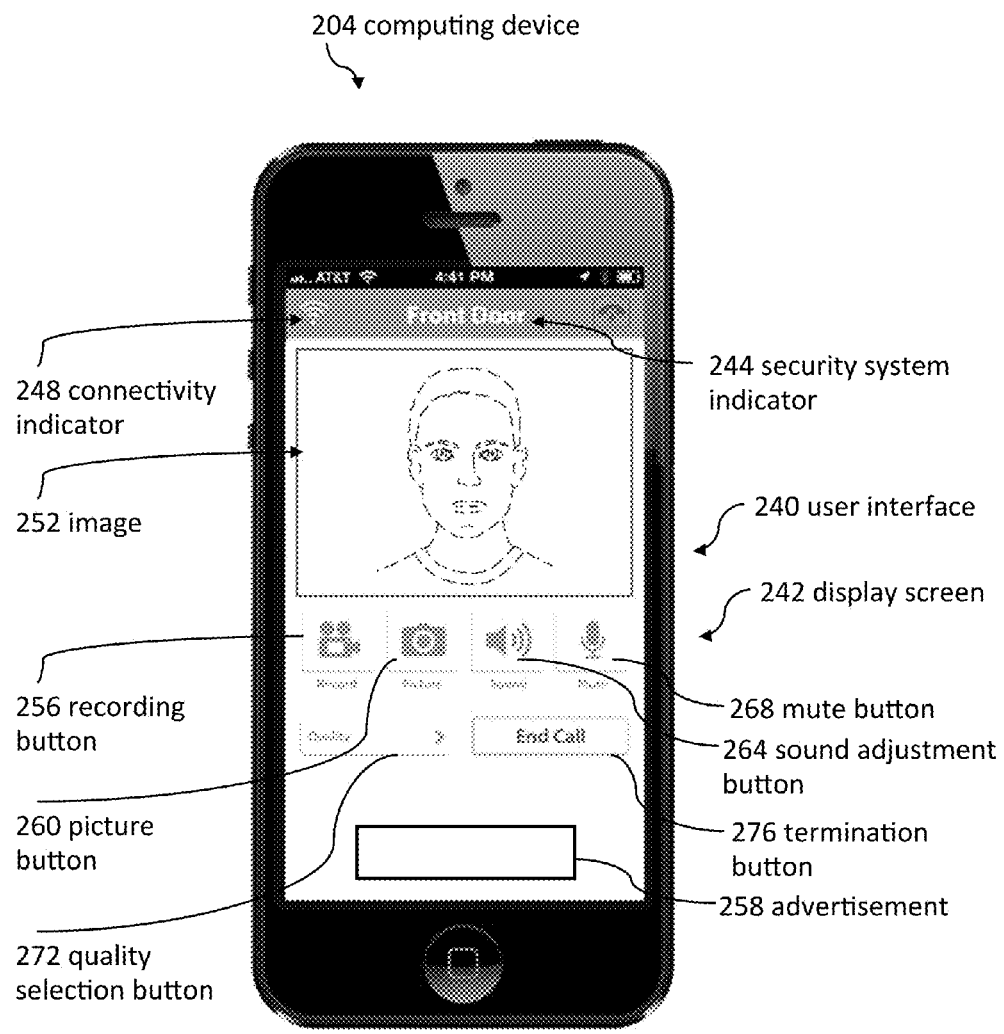
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the Internet, and/or a cellular network. The connectivity indicator 248 can alert the user if the computing device 204 has lost its connection with the security system 202c; the security system 202c has been damaged; the security system 202c has been stolen; the security system 202c has been removed from its mounting location; the security system 202c has lost electrical power; and/or if the computing device 204 cannot communicate with the security system 202c. In some embodiments, the connectivity indicator 248 alerts the user of the computing device 204 by flashing, emitting a sound, displaying a message, and/or displaying a symbol.

Referring now to FIG. 1a, in some embodiments, if the security system 202c loses power, loses connectivity to the computing device 204, loses connectivity to the Internet, and/or loses connectivity to a remote server, a remote server 206 transmits an alert (e.g., phone call, text message, image on the user interface 240) regarding the power and/or connectivity issue. In several embodiments, the remote server 206 can manage communication between the security system 202c and the computing device 204. In some embodiments, information from the security system 202c is stored by the remote server 206. In several embodiments, information from the security system 202c is stored by the remote server 206 until the information can be sent to the computing device 204, uploaded to the computing device 204, and/or displayed to the remotely located person via the computing device 204. The remote server 206 can be a computing device that stores information from the security system 202c and/or from the computing device 204. In some embodiments, the remote server 206 is located in a data center.

In some embodiments, the computing device 204 and/or the remote server 206 attempts to communicate with the security system 202c. If the computing device 204 and/or the remote server 206 is unable to communicate with the security system 202c, the computing device 204 and/or the remote server 206 alerts the remotely located person via the software, phone, text, a displayed message, and/or a website.

In some embodiments, the computing device 204 and/or the remote server 206 attempts to communicate with the security system 202c periodically; at least every five hours and/or less frequently than every 10 minutes; at least every 24 hours and/or less frequently than every 60 minutes; or at least every hour and/or less frequently than every second.

In some embodiments, the server 206 can initiate communication to the computer device 204 and/or to the security system 202c. In several embodiments, the server 206 can initiate, control, and/or block communication between the computing device 204 and the security system 202c.

In several embodiments, a user can log in to an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

Referring now to FIG. 2, in some embodiments, the user interface 240 displays an image 252 such as a still image or a video of an area near and/or in front of the security system 202c. The image 252 can be taken by the camera assembly 208 and stored by the security system 202c, server 206, and/or computing device 204. The user interface 240 can include a recording button 256 to enable a user to record images, videos, and/or sound from the camera assembly 208, microphone of the security system 202c, and/or microphone of the computing device 204.

In several embodiments, the user interface 240 includes a picture button 260 to allow the user to take still pictures and/or videos of the area near and/or in front of the security system 202c. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202c to enable the camera assembly 208 to provide sufficient visibility (even at night).

In some embodiments, buttons include diverse means of selecting various options, features, and functions. Buttons can be selected by mouse clicks, keyboard commands, or touching a touch screen. Many embodiments include buttons that can be selected without touch screens.

In some embodiments, the user interface 240 includes a quality selection button, which can allow a user to select the quality and/or amount of data transmitted from the security system 202c to the computing device 204 and/or from the computing device 204 to the security system 202c.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

As shown in FIG. 2, the user interface 240 can include a termination button 276 to end communication between the security system 202c and the computing device 204. In some embodiments, the termination button 276 ends the ability of the person located near the security system 202c (i.e., the visitor) to hear and/or see the user of the computing device 204, but does not end the ability of the user of the computing device 204 to hear and/or see the person located near the security system 202c.

In some embodiments, a button 276 is both an answer button (to accept a communication request from a visitor) and a termination button (to end communication between the security system 202c and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system 202c detects a visitor (e.g., senses indications of a visitor). Once the user interface 240 opens, the user can see and/or hear the visitor. The security system 202c can include a microphone 234 and a speaker 236 to enable the user to hear the visitor and to enable the visitor to hear the user. In this regard, the speaker 236 may be configured to transmit an audible message to the visitor and the microphone 234 may be configured to receive an audible message from the visitor. In some embodiments the speaker 236 and microphone 234 are located within an internal portion of the outer housing 634. However, in other embodiments, the speaker 236 and microphone 234 are located along an external surface of the outer housing 634. Thus, the security system 202c can enable the user to communicate with the visitor.

Some method embodiments include detecting a visitor with a security system. The methods can include causing the user interface 240 (shown in FIG. 2) to display on a remote computing device 204 due to the detection of the visitor (e.g., with or without user interaction). The methods can include displaying video from the security system and/or audio from the security system.

In some embodiments, the software includes means to start the video feed on demand. For example, a user of the computing device might wonder what is happening near the security system 202c. The user can open the software application on the computing device 204 and instruct the application to show live video and/or audio from the security device 202c even if no event near the security system 202c has triggered the communication.

In several embodiments, the security device 202c can be configured to record video, images, and/or audio when the security device 202c detects movement and/or the presence of a person. The user of the computing device 204 can later review all video, image, and/or audio records when the security device 202c detected movement and/or the presence of a person.

Referring now to FIG. 1a, in some embodiments, the server 206 controls communication between the computing device 204 and the security system 202c, which can include a camera, a microphone, and a speaker. In several embodiments, the server 206 does not control communication between the computing device 204 and the security system 202c.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review the visits from the last year. In some embodiments, remote storage, the server 206, the computing device 204, and/or the security system 202c can store information and statistics regarding visitors and usage.

The communication system 200 can include the security system 202c, the computing device 204, and/or the server 206. Some communication systems use many systems to enable communication between the security system 202c and the computing device 204.

FIG. 3 illustrates an embodiment in which a security system 202c is connected to a building 300, which can include an entryway 310 that has a door 254. Electrical wires 304 can electrically couple the security system 202c to the electrical system of the building 300 such that the security system 202c can receive electrical power from the building 300 (e.g., via a light socket that is attached to the building 300).

A wireless network 308 can allow devices to wirelessly access the Internet. The security system 202c can access the Internet via the wireless network 308. The wireless network 308 can transmit data from the security system 202c to the Internet, which can transmit the data to remotely located computing devices 204. The Internet and wireless networks can transmit data from remotely located computing devices 204 to the security system 202c. In some embodiments, a security system 202c connects to a home's WiFi.

As illustrated in FIG. 3, one computing device 204 (e.g., a laptop, a smartphone, a mobile computing device, a television) can communicate with multiple security systems 202c. In some embodiments, multiple computing devices 204 can communicate with one security system 202c.

In some embodiments, the security system 202c can communicate (e.g., wirelessly 230) with a television 306, which can be a smart television. Users can view the television 306 to see a visitor and/or talk with the visitor.

As well, in some embodiments, the visitor and user of the remote computing device 204 are able to talk with each other, via the security system 202c and the remote computing device 204. For example, the security system 202c may be configured to transmit a first audible message to the visitor. The first audible message may be received by a microphone in the remote computing device 204 and transmitted to the security system 202c. In this regard, the first audible message may be audibly transmitted to the visitor via the speaker 236 in the security system 202c. As well, the security system may be configured to transmit a second audible message to a user of the remote computing device 202c. The second audible message may be received by the microphone 234 in the security system 202c and transmitted to the remote computing device. In this regard, the second audible message may audibly transmitted to the user via a speaker in the remote computing device 204.

Figure 4:
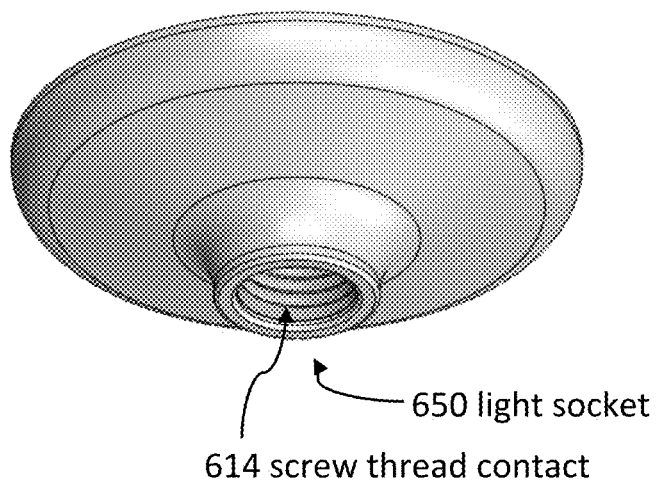
FIG. 4 illustrates a perspective view of a light socket, according to some embodiments.

FIG. 4 illustrates a perspective view of a light socket 650. The light socket 650 can include a screw thread contact 652 configured to mechanically and electrically couple with the screw thread contact 614 of the security system 202c (shown in FIG. 1a). The light socket 650 can also include a foot contact 654 configured to electrically couple with the foot contact 618 of the security system 202c (shown in FIG. 1a). The foot contact 654 of the light socket 650 can be located at the distal end of the light socket 650.

In some embodiments, the security system 202c can be described as having a proximal end and a distal end that is opposite the proximal end. The camera assembly 208 can be located at the distal end of the security system 202c. The security system 202c can include the foot electrical contact 618 located at the proximal end of the security system 202c. In order to energize the security system 202c, the security system 202c can be oriented such that the foot electrical contact 618 faces the foot contact 654 of the light socket 650. In this manner the distal end of the security system 202c faces away from the foot contact 654 of the light socket 650. As well, the camera assembly 608 can face away from the foot contact 654 of the light socket 650. Once the security system 202c is oriented in this manner, the security system 202c can be attached to the light socket 650.

Figure 6:
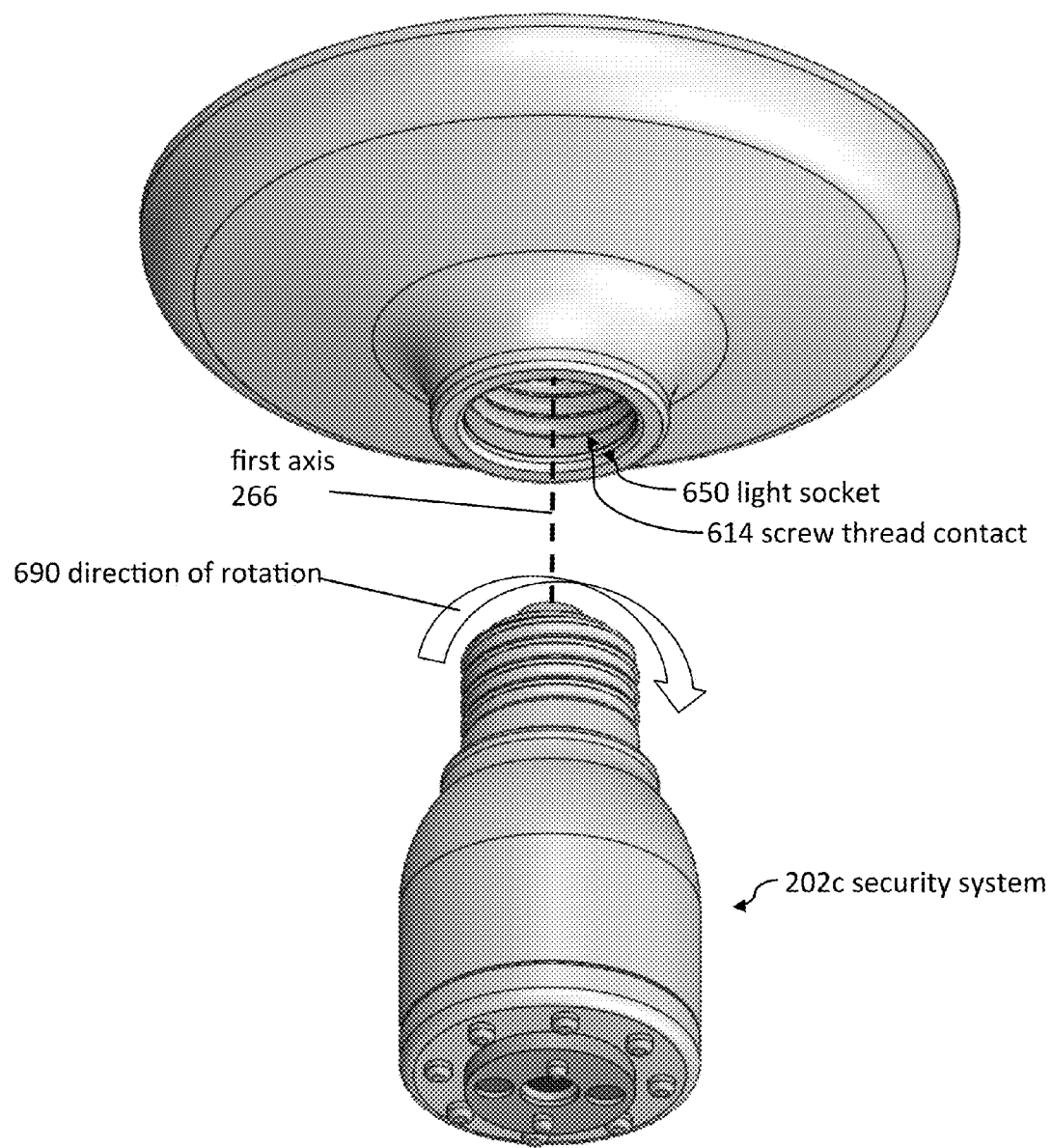
FIG. 6 illustrates a perspective view of a security system prior to the security system being mechanically and electrically coupled to the light socket, according to some embodiments.
Figure 7:
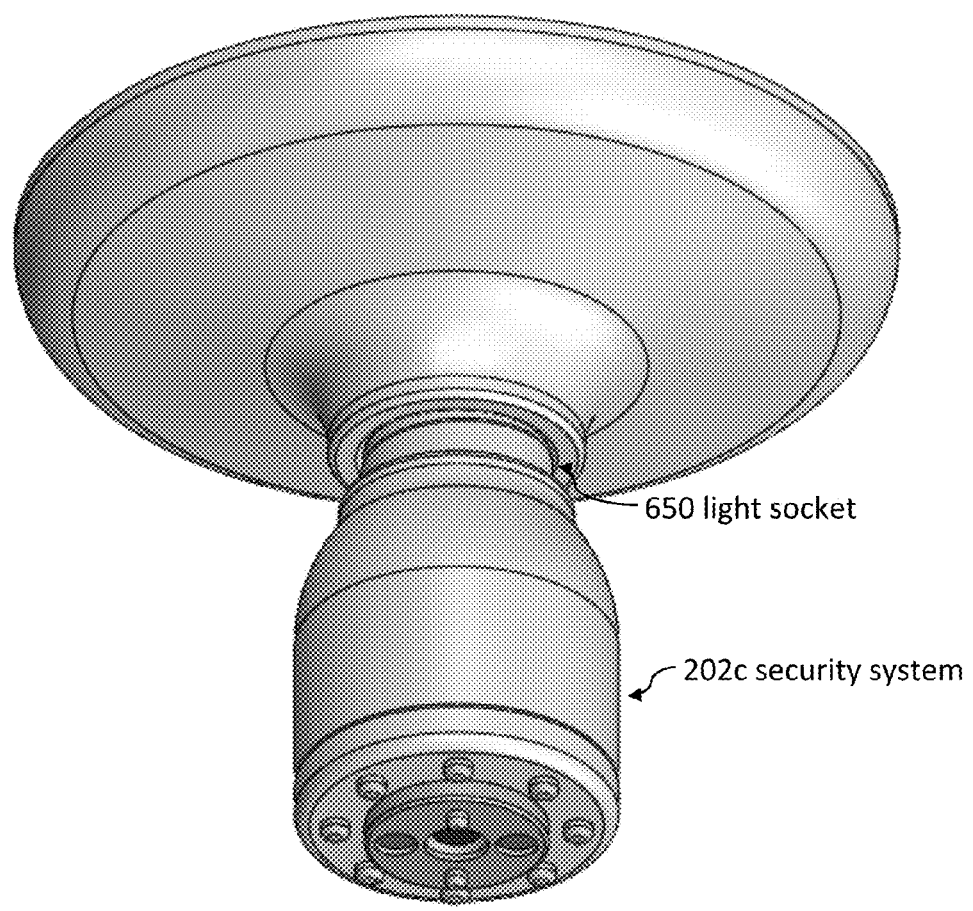
FIG. 7 illustrates the security system mechanically and electrically coupled to the light socket, according to some embodiments.

In some embodiments, the security system 202c is rotated as it is attached to the light socket 650. As shown in FIG. 6, the security system 202c can be rotated in a direction of rotation 690 about a first axis 266 to thereby attach the security system 202c to the light socket 650. As such, the foot contact 654 of the light socket 650 can be electrically coupled to the security system 202c. Furthermore, in many embodiments the foot contact 654 of the light socket 650 is electrically coupled to a light switch (not shown). In this manner, the foot contact 654 of the light socket 650, and the foot contact 618 of the security system 202c can be energized, when the light switch is activated (i.e. turned on).

Figure 5:
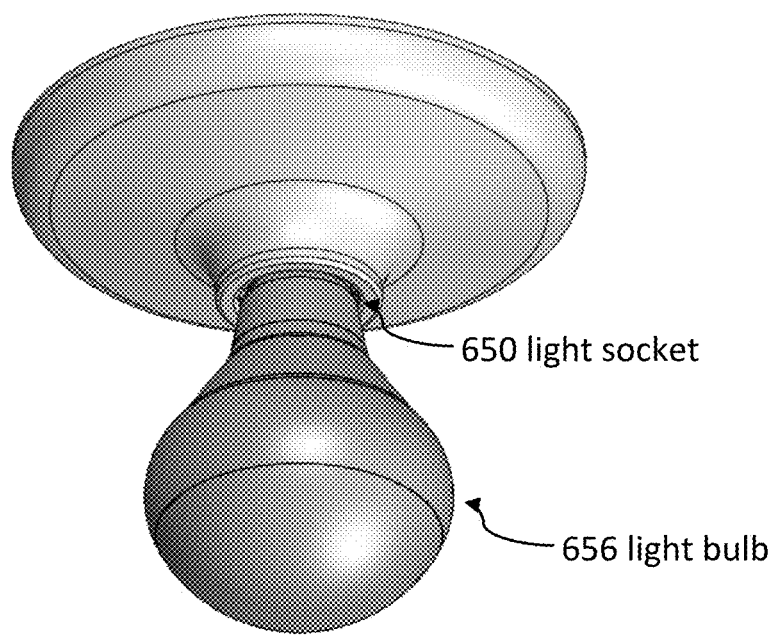
FIG. 5 illustrates a perspective view of a light bulb mechanically and electrically coupled to a light socket, according to some embodiments.

FIG. 5 illustrates a perspective view of a light bulb 656 mechanically and electrically coupled to the light socket 650. The light bulb 656 can be removed and replaced by a security system that comprises lights and a camera.

FIG. 6 illustrates a perspective view of the security system 202c just before the security system 202c is screwed into the light socket 650 to mechanically couple the security system 202c to a wall and/or to a building 300. Screwing the security system 202c into the light socket 650 also enables the security system 202c to receive electricity from the building 300 (shown in FIG. 3).

FIG. 7a illustrates the security system 202c screwed into the light socket 650. In this configuration, the security system 202c is electrically coupled to a power supply of the building 300. The light socket 650 can be located indoors or outdoors.

Figure 8:
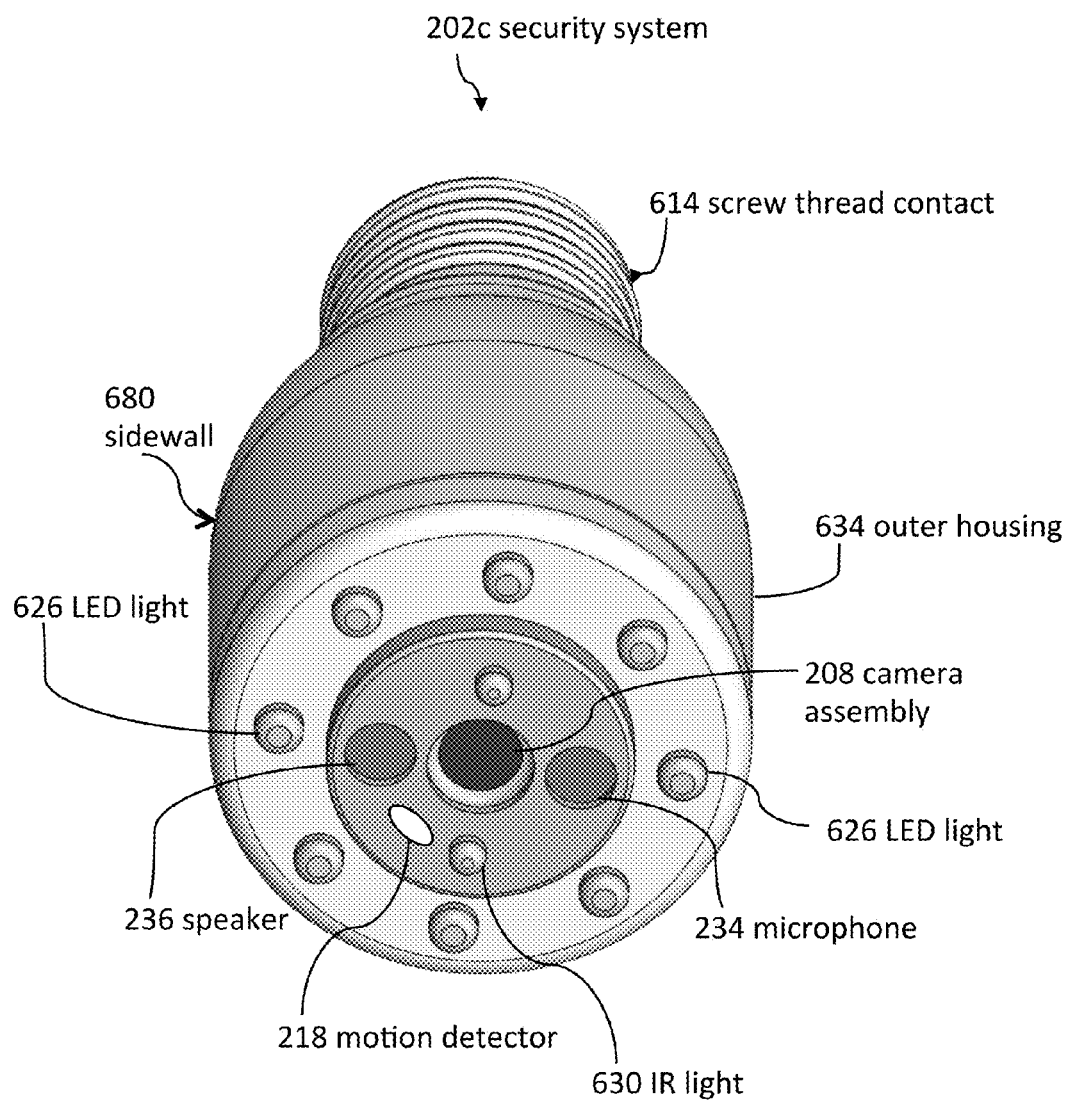
FIGS. 8 and 9 illustrate perspective views of security systems, according to some embodiments.

FIG. 8 illustrates a perspective view of the security system 202c. Not all of the lights 626, 630 are labeled to clarify other features. The camera assembly 208 can be aligned with a central axis 266 of the screw thread contact 614. The camera assembly 208 can include a fisheye lens. The camera assembly 208 can also include a cone-shaped mirror to enable viewing 360 degrees around the camera and/or around the outer housing 634. Software can be used to convert videos and/or pictures taken using the cone-shaped mirror into different formats (e.g., that are easier for users to interpret and/or include less distortion).

Figure 9:
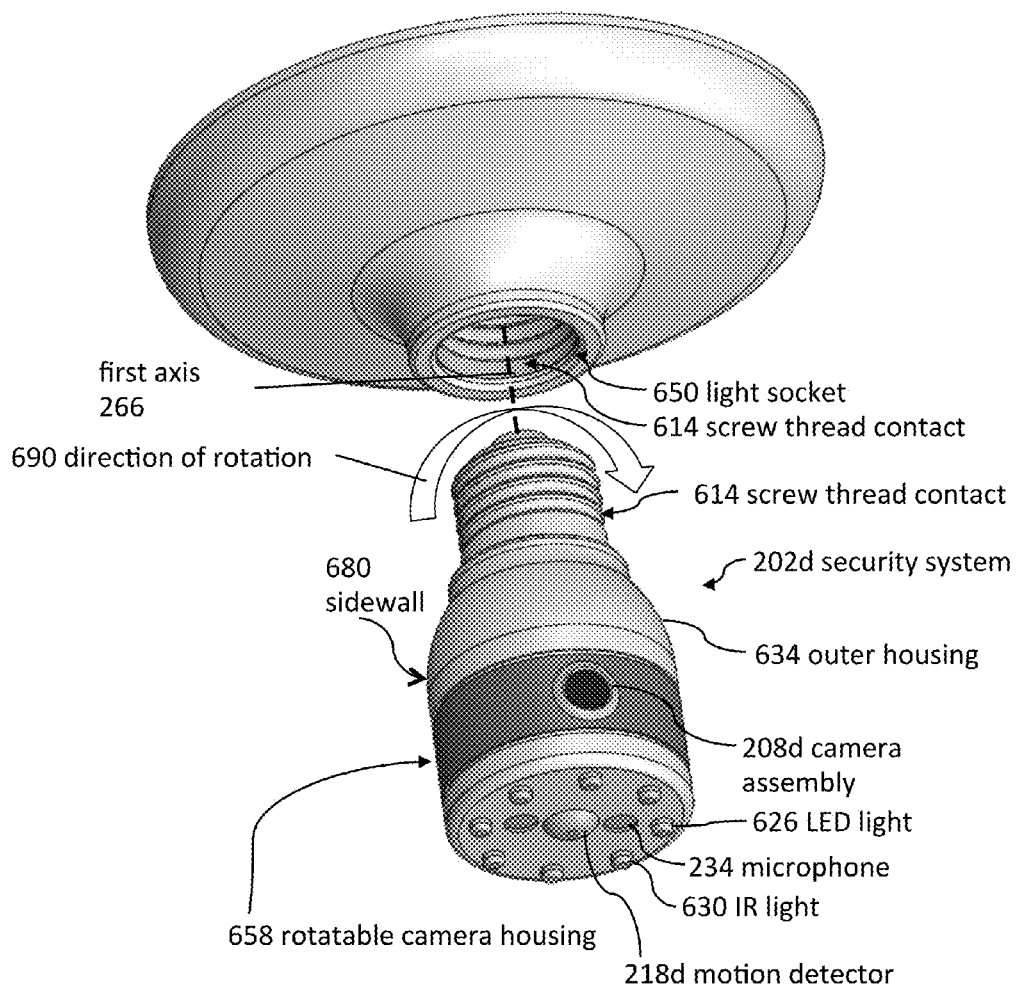
Figure 10:
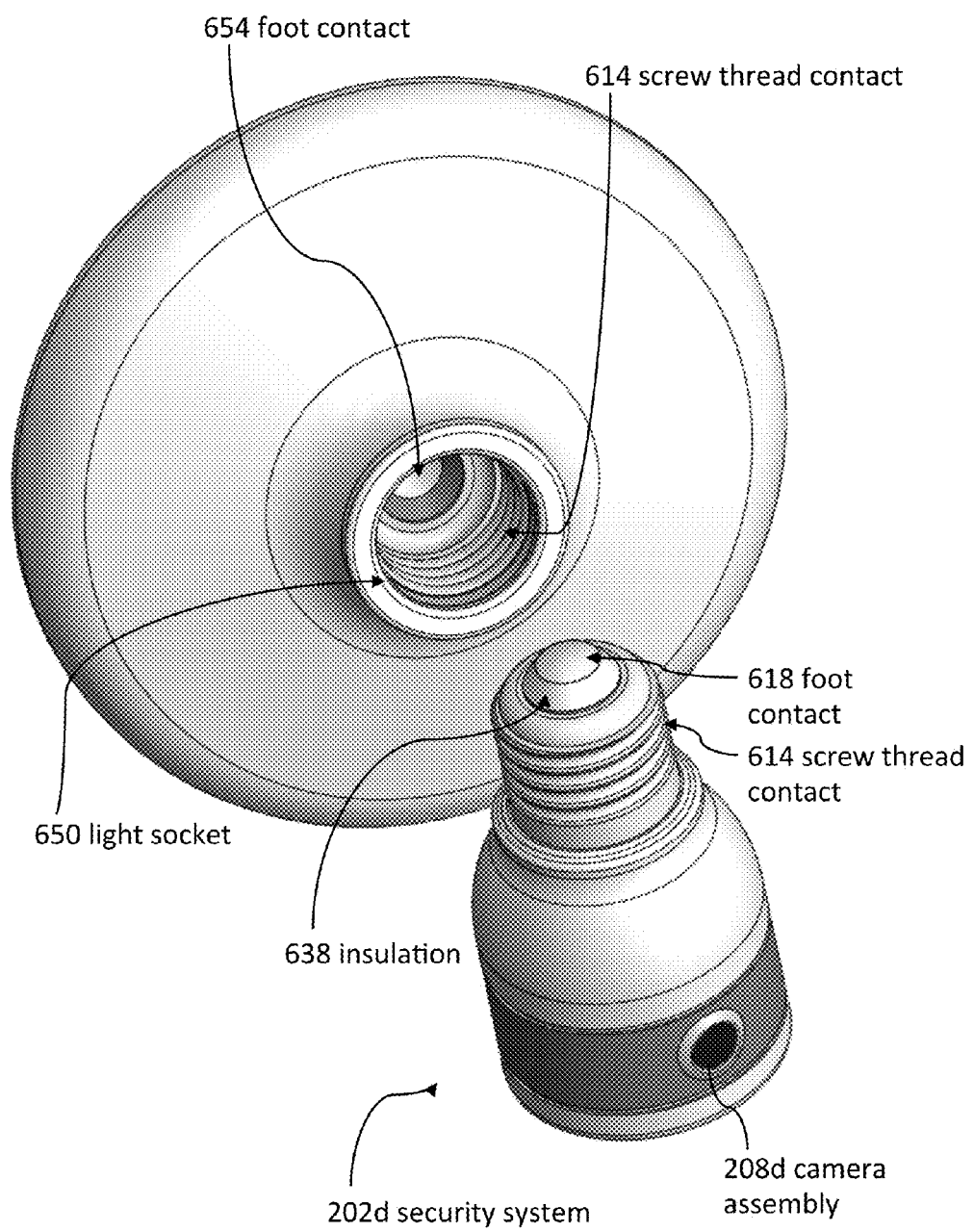
FIG. 10 illustrates a perspective view of electrical contacts, according to some embodiments.

FIGS. 9 and 10 illustrate a security system 202d that can include any of the features described in the context of the security system 202c shown in FIGS. 1a, 1b and 3-8. The security system 202d, as shown in FIG. 9, can also be configured to screw into the light socket 650. In this manner, the security system 202d can be rotated in a direction of rotation 690 about a first axis 266 to thereby attach the security system 202d to the light socket 650. The security system 202d can include a camera assembly 208d that faces a radial direction that is perpendicular to the first axis 266.

As shown in FIG. 9, the security system 202d can include a motion detector 218d configured to detect visitors (e.g., people moving outside of a building 300, people moving inside of a room). The motion detector 218d can be located at the distal end of the security system 202c such that the motion detector 218d faces away from the foot contact 618 of the security system 202c.

Furthermore, the security system 202d can include a rotatable camera housing 658. A camera assembly 208d can be coupled to the rotatable camera housing 658 such that the camera assembly 208d rotates around the perimeter of the outer housing 634 of the security system 202d as the camera housing 658 rotates around the perimeter of the outer housing 634. The camera housing 658 can rotate around a central axis 266 of the screw thread contact 614.

In some embodiments, the camera housing 658 can rotate in response to an event, such as a person entering a room, outdoor area, or space adjacent to the security system 202c. For example, the motion detector 218d can detect the person (s), such as the visitor(s), and in response to the motion detector 218d detecting the person(s), the security system 202c can cause the camera housing 658 to rotate to a position whereby the camera assembly 208 can record an image and/or video of the person(s).

The camera housing 658 can be rotated via any number of rotation methods. In some embodiments, the rotation of the camera housing 658 is caused by a command from a remote computing device, such as a smart phone, tablet, or other cellular device. For example, a user of the remote computing device can input a command into an app that is run on the remote computing device. The command can then be transmitted from the remote computing device to the security system 202c, to thereby rotate the camera housing 658.

Describing the camera housing 658 differently, the sidewall 680 of the security system 202c can comprise a first portion, such as an outer housing 634, and a second portion, such as a rotatable camera housing 658, which is distal to the first portion. The second portion, or rotatable camera housing 658, can be rotatable about the first axis 266. The camera housing 658 can be manually rotated by the user. For example, the user can grip the camera housing 658 with his or her hand and rotate the camera housing 658 to a desired position. As well, the camera housing 658 can be rotated by the security system 202c, such as, in response to an event. For example, when the security system 202c detects the visitor, via the motion detector 218d, the security system 202c can then determine whether the visitor is located within a field of vision of the camera 208. Accordingly, in response to determining that the visitor is not located within the field of vision of the camera 208, the security system 202c can rotate the second portion, or camera housing 658. Furthermore, the security system 202c can rotate the camera 208 about the first axis until 266 the visitor is within a field of vision of the camera 208.

Additionally, the security system 202c may be configured to receive an instruction from a remote computing device 204. The instruction may include a command to rotate the second portion, or camera housing 658, to any location as determined by the user of the remote computing device 204. Accordingly, in response to receiving the instruction from the remote computing device 204, the security system 202c may be configured to rotate the second portion such that the camera 208 rotates about the first axis 266. As such, the user of the remote computing device 204 may be able to remotely rotate the camera housing 658 to thereby change the field of vision of the camera 208.

The security system 202d can use a microphone 234 to listen for visitors. When the security system 202d detects visitors (e.g., via motion or sound), the security system 202d can turn on LED lights 626, record sounds from the visitors, and/or take videos of the visitors. In some embodiments, the security system 202d records when visitors move by the security system 202d.

FIG. 10 illustrates a perspective view of electrical contacts. Connecting the security system 202d to the light socket 650 can enable the security system 202d to be electrically connected to a power supply.

Figure 11:
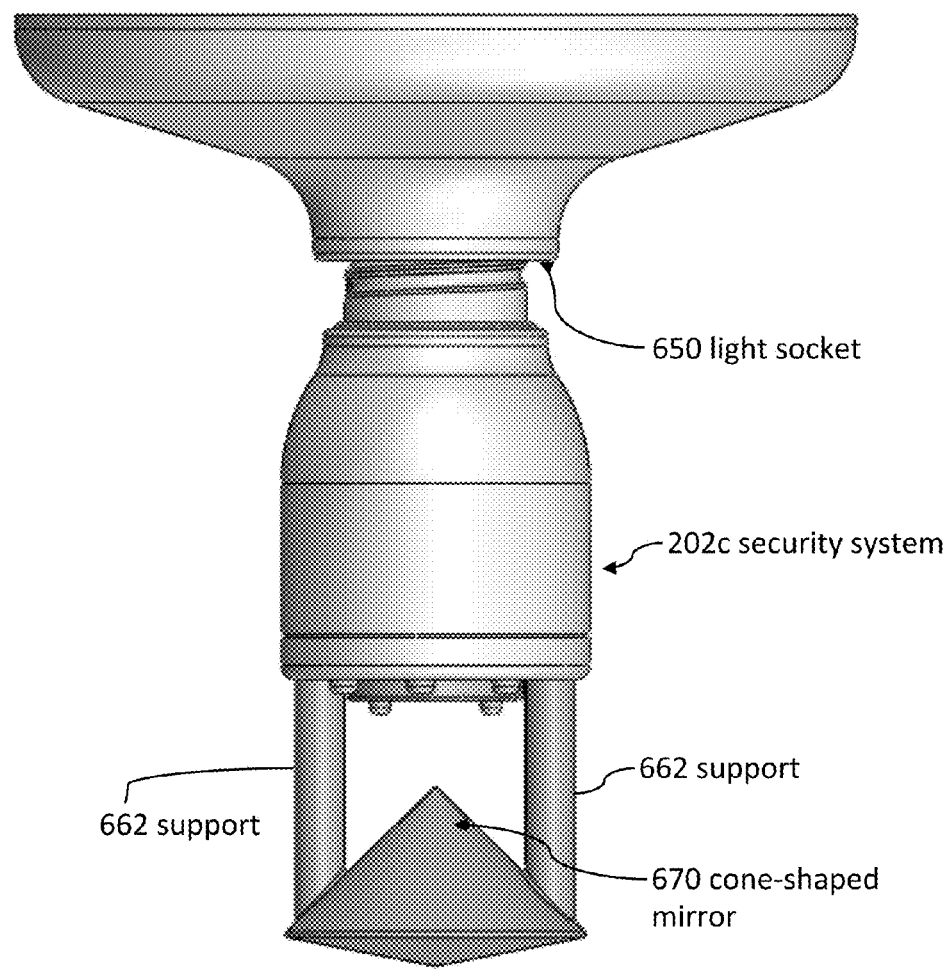
FIG. 11 illustrates a side view of a security system with a cone-shaped mirror, according to some embodiments.

FIG. 11 illustrates a side view of a security system 202c with a cone-shaped mirror 670. Supports 662 can extend from an end of the security system 202c that is opposite an end that includes the screw thread contacts 614 (labeled in FIG. 12).

Figure 12:
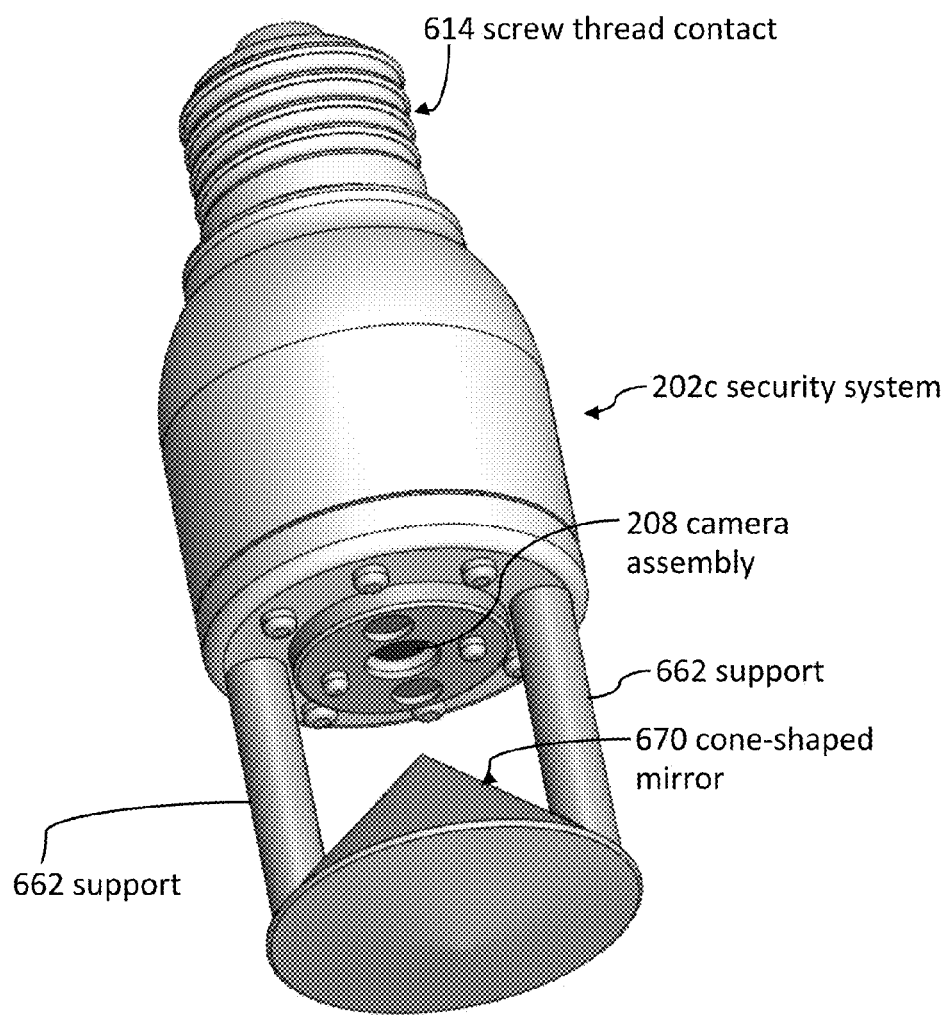
FIG. 12 illustrates a perspective view of the security system with a cone-shaped mirror, according to some embodiments.

FIG. 12 illustrates a perspective view of the security system with a cone-shaped mirror 670. The camera assembly 208 can include a camera that is oriented towards the cone-shaped mirror to enable the security system 202c to record visitors in many directions around the security system 202c. Software can be used by the security system 202c, the remote computing device 204, and/or the server 206 to reduce and/or eliminate distortion in pictures taken using the security system 202c.

Figure 13A:
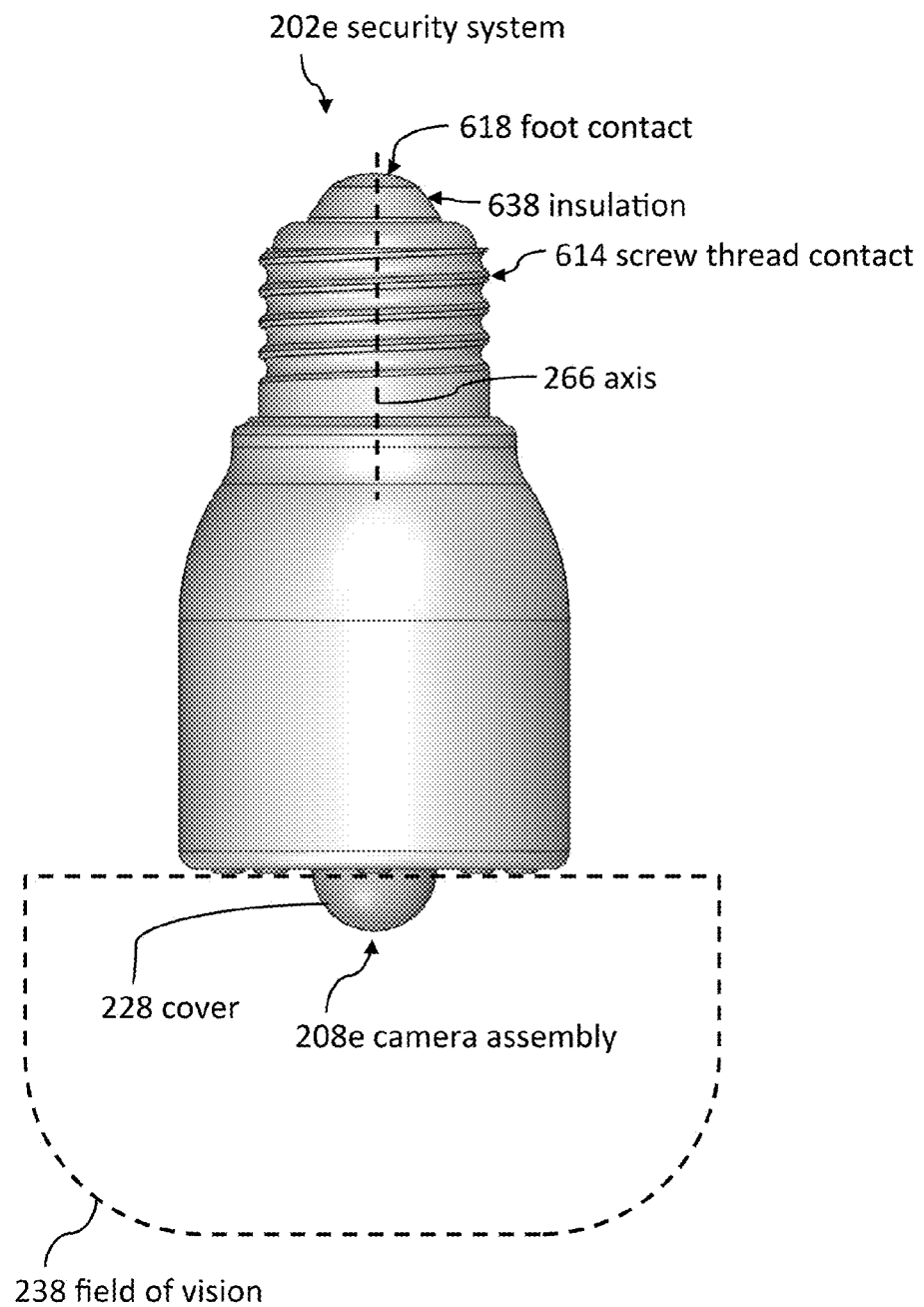
FIGS. 13a, 13b, 13c, and 13d illustrate side views of security systems with respective dome camera assembly, according to various embodiments.
Figure 13B:
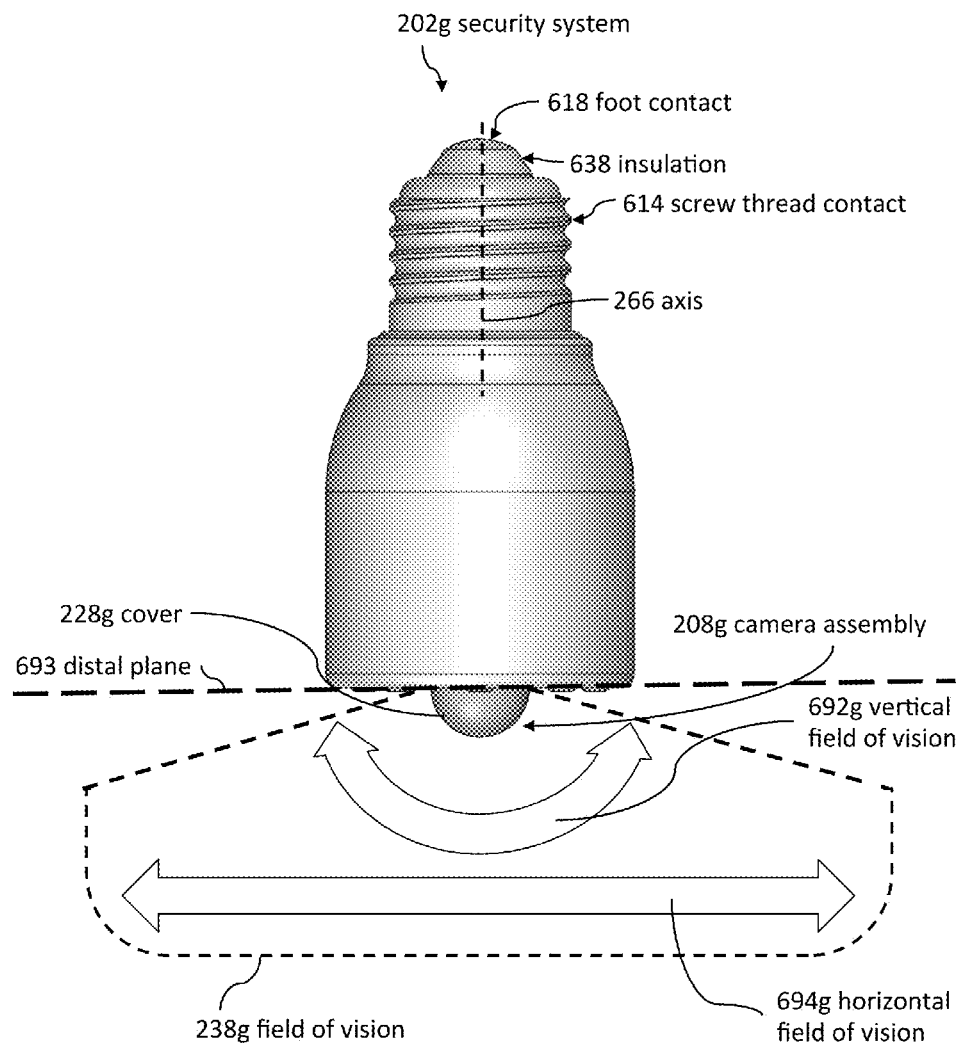

FIG. 13a illustrates a side view of a security system 202e with a dome camera assembly 208e. The dome camera assembly 208e can have a shape that is half of a sphere. In some embodiments, the dome camera assembly 208e includes an outer cover 228 that has a curved and/or spherical shape (e.g., half of a sphere). The cover 228 can be a translucent material such as plastic and/or polycarbonate.

The field of vision 238 of the dome camera assembly 208e can include half of a sphere. In some embodiments, the field of vision 238 includes approximately 360 degrees around the base of the cover 228 and/or around a central axis 266 of the screw thread contacts 614. In several embodiments, the field of vision 238 includes at least 330 degrees around the base of the cover 228. In some embodiments, the field of vision 238 is approximately 180 degrees in a plane that includes the central axis 266 of the screw thread contacts 614 (e.g., in the plane represented by the page on which FIG. 13a appears). In several embodiments, the field of vision 238 is at least 140 degrees and/or less than 260 degrees in a plane that includes the central axis 266.

Figure 13C:
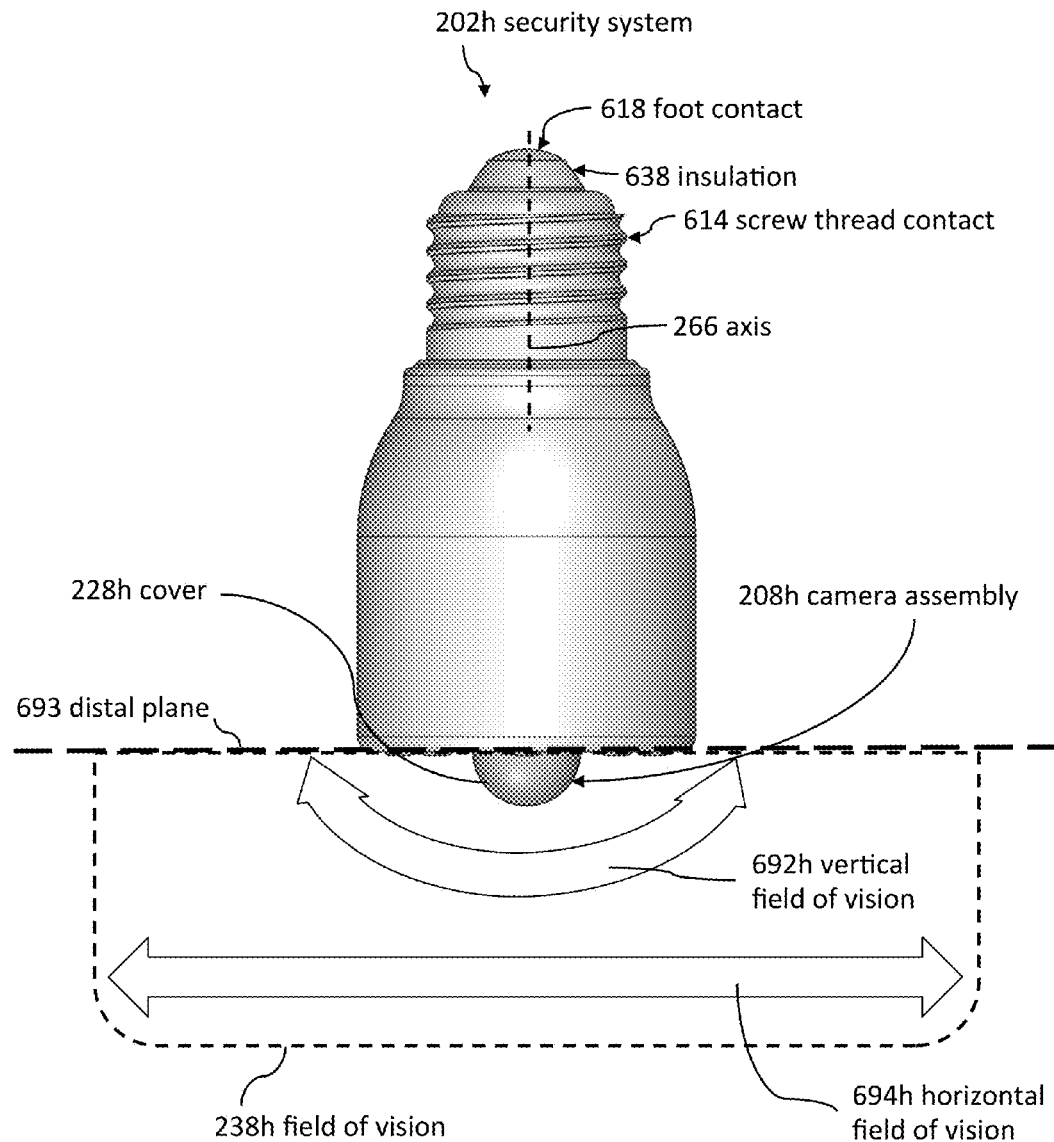
Figure 13D:
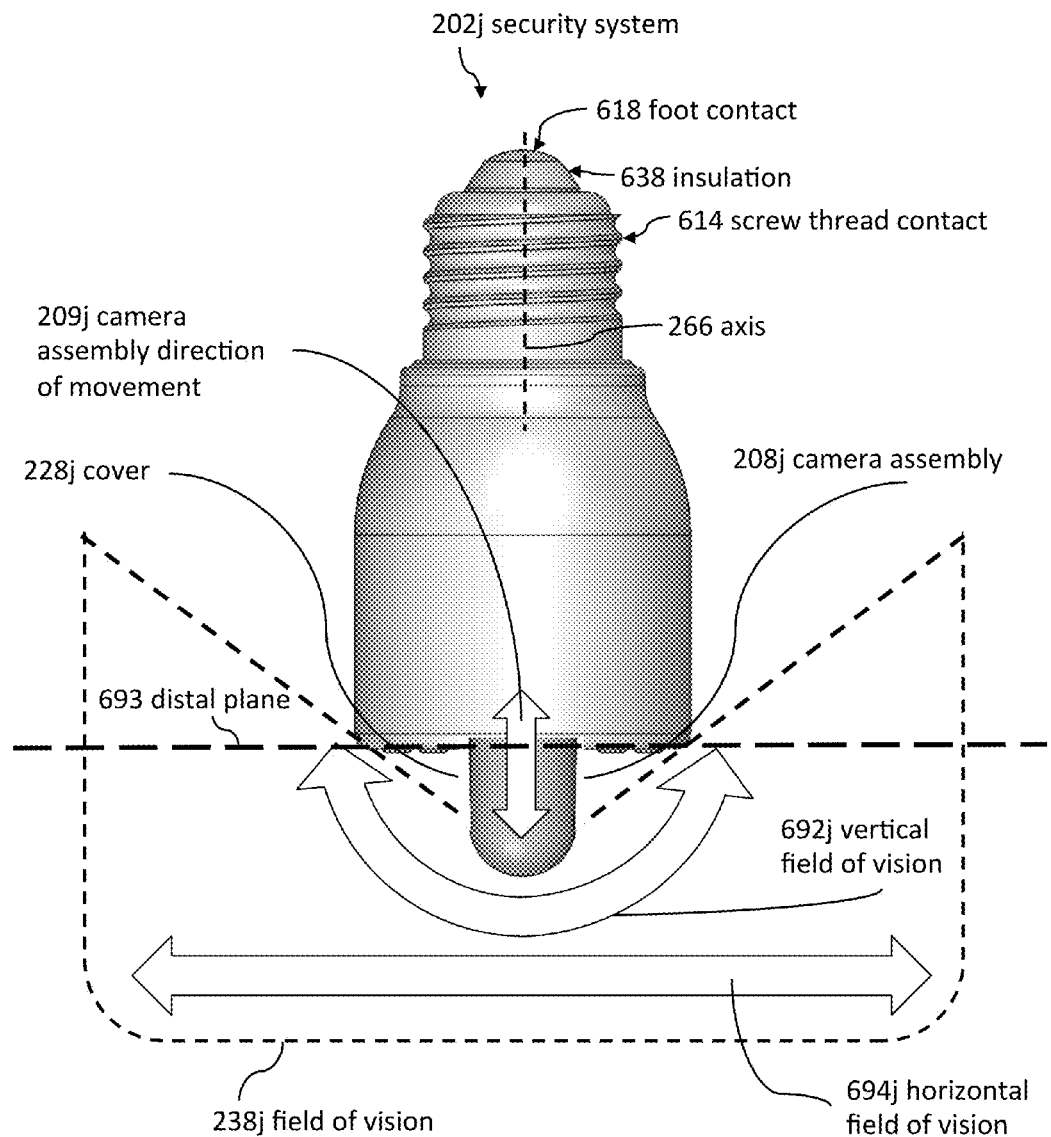
Figure 13E:
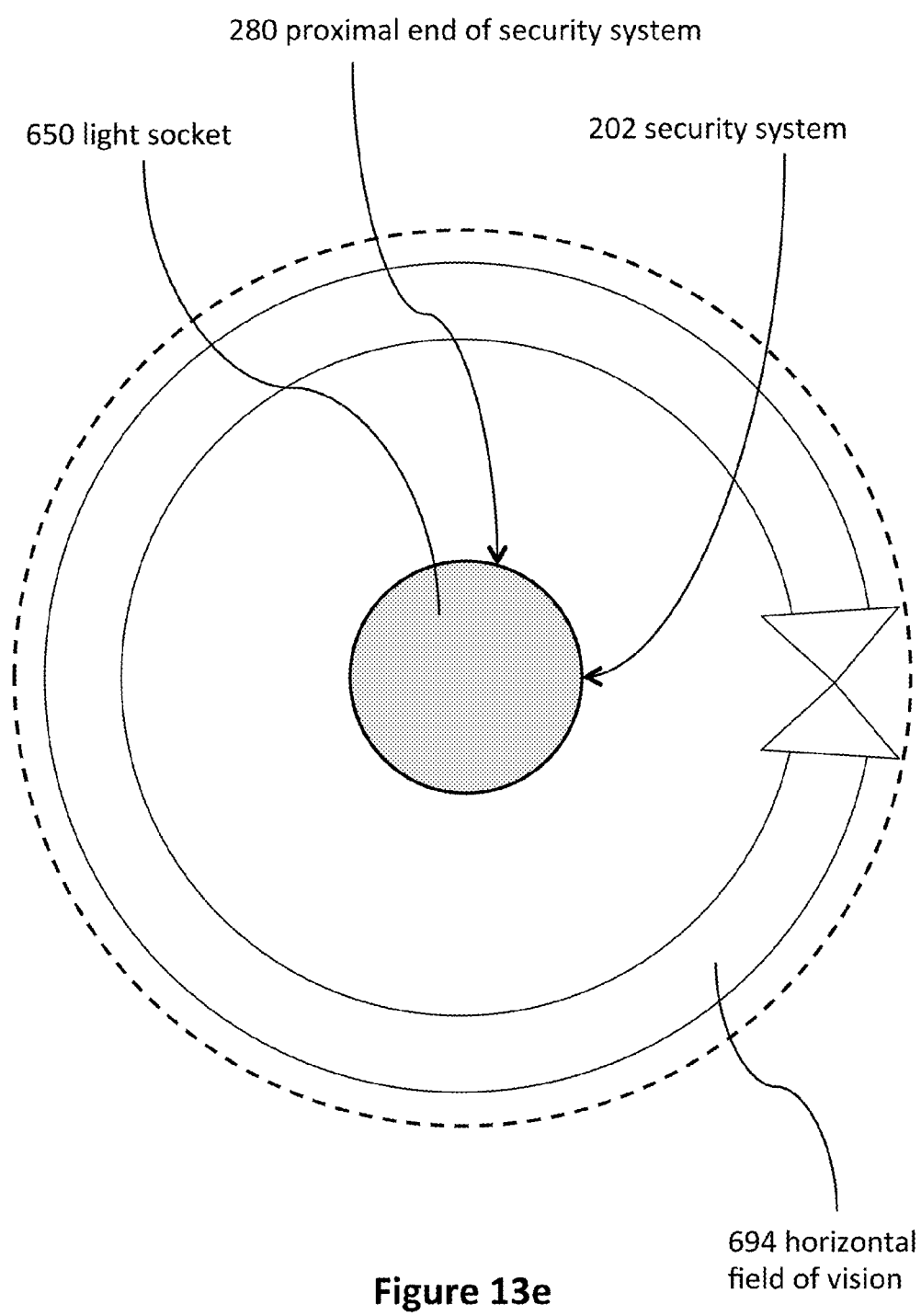
FIG. 13e illustrates a top-down view of a security system with a horizontal field of vision, according to some embodiments.

FIGS. 13b-13e further illustrate the field of vision in various embodiments. With specific reference to FIG. 13b, the field of vision 238g can be defined by a vertical field of vision 692g and a horizontal field of vision 694g. The vertical field of vision 692g can be any angle less than 180 degrees (as shown by the distal plane 693), such as 140 degrees. Because FIGS. 13b-13e are side views, the horizontal field of vision 692g and the vertical field of vision 694g are actually radial, meaning that they extend 360 degrees around the perimeter of the camera assembly 208g. This 360 degree periphery is further illustrated in FIG. 13e. FIG. 13e is a top down view, looking from above the security system (when it is mounted to the light socket 650) to the ground below the security system. FIG. 13e shows that the horizontal field of vision 694, 694g actually covers 360 degrees around the perimeter of the security system and the axis 266. While the vertical field of vision is not illustrated in FIG. 13e, the vertical field of vision is also radial, in that it covers the 360 degree area around the security system.

The security system 202h illustrated in FIG. 13c may define a 180 degree vertical field of vision, which means that the camera assembly 208h is able to see anything that is level with or below the distal plane 693.

Furthermore, as shown in FIG. 13d, the security system 202j may be configured to achieve a vertical field of vision 692j that is greater than 180 degrees. For example, some embodiments may have a vertical field of vision equal to at least 250 degrees, up to 250 degrees, up to 280 degrees, and in some embodiments, up to 300 degrees. (It should be appreciated that in some embodiments that utilize multiple cameras, a vertical field of vision of up to 360 degrees may be achieved.) In the embodiment shown in FIG. 13d, to accomplish a vertical field of vision greater than 180 degrees, the camera assembly 208j may be configured to move vertically downward. Specifically, the camera assembly 208j may be configured to move along a camera assembly direction of movement 209j, as shown in FIG. 13d. In this regard, the camera assembly 208j may thereby gain separation from the distal end of the security system 202j. This may allow the camera assembly 208j to achieve a greater line of sight past the sidewalls in the upward, or proximal, direction.

It should be appreciated that various methods may be used to retain the camera assembly 208h at various locations along the camera assembly direction of movement 209h. In some embodiments, the camera assembly 208h may be configured to engage mechanical latches to secure the camera assembly 208h at discrete locations along the direction of movement 209h. In some embodiments, the camera assembly 208h may be configured to be retained at any location along the direction of movement 209h via friction. In some embodiments, the camera assembly 208h may be threadably engaged and disengaged at various locations along the direction of movement 209h. As well, once the camera assembly 208h has been moved to its desired vertical position, the camera assembly 208h is still thereby mechanically and electrically coupled to the security system.

As well, it should be appreciated that the camera assembly 208h may be vertically moved along the direction of movement 209h in response to any command or manual movement. For example, the camera assembly 208h may be moved in response to a command from a remote computing device 204. As well, the camera assembly 208h may be moved along the direction of movement 209h in response to detecting a visitor. For example, the camera assembly 208h may be positioned in a retracted position, whereby the camera assembly 208h is located substantially within the security system as shown in FIGS. 13c and 13d. Accordingly, in response to the motion detector 218 detecting a visitor, the camera assembly 208h may then move to an extended position (as shown in FIG. 13d) to capture a greater vertical field of vision than in the retracted position. Moreover, the camera assembly 208h may be manually moved by a user.

Figure 14:
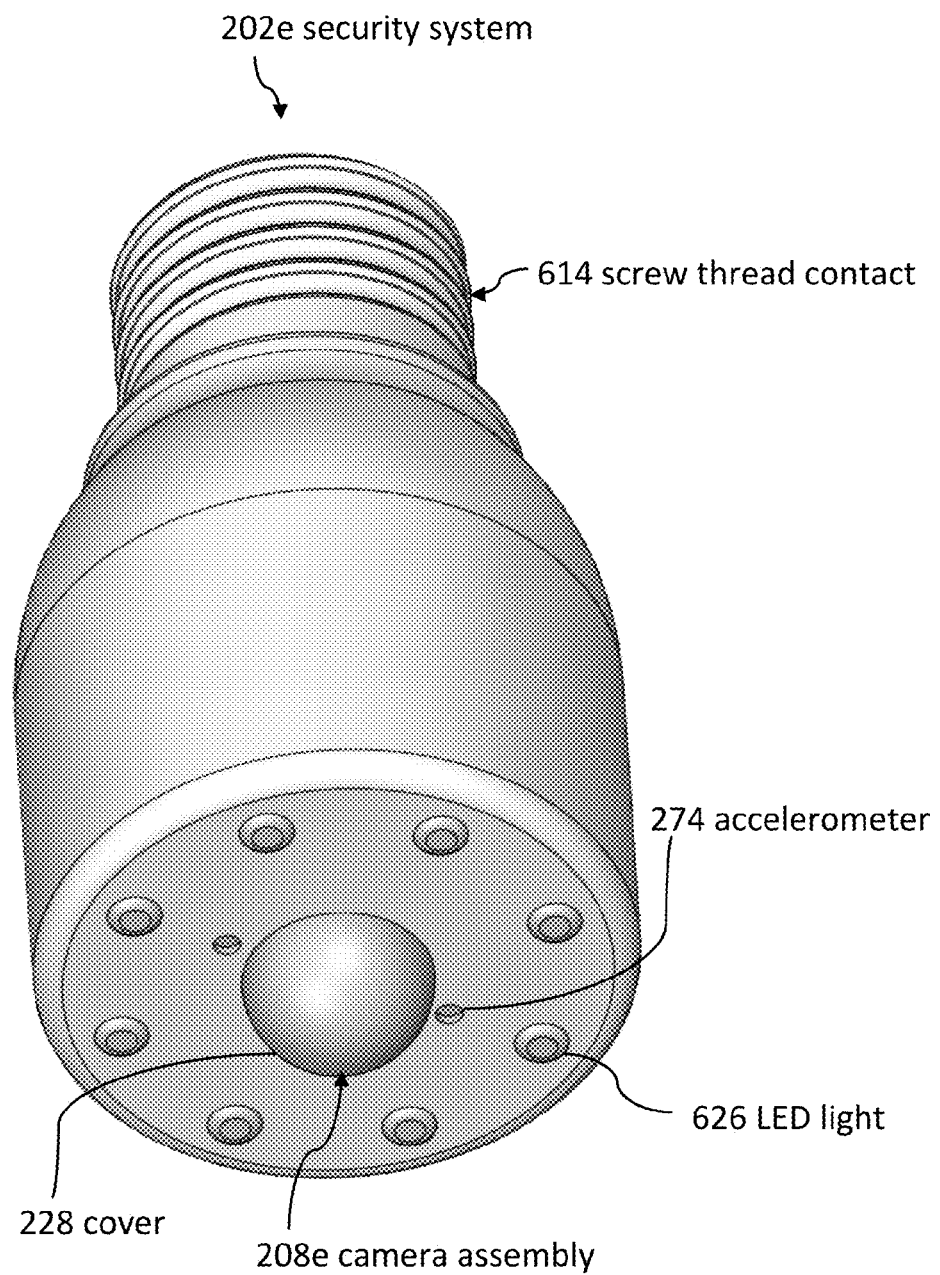
FIG. 14 illustrates a perspective view of a security system, according to some embodiments.

FIG. 14 illustrates a perspective view of the security system 202e from FIG. 13a. The dome camera assembly 208e can be used with any of the security systems described herein. The security system 202e can include lights (e.g., LEDs) on an end that is opposite the end that includes the screw thread contacts 614.

Any of the security systems described herein can use the methods and systems described in U.S. Nonprovisional patent application Ser. No. 14/463,548; filed Aug. 19, 2014; and entitled DOORBELL COMMUNICATION SYSTEMS AND METHODS; the entire contents of which are incorporated herein by reference. For example, the grid sensor methods can be used with security systems 202c, 202d, and 202e. The security system embodiments described in U.S. Nonprovisional patent application Ser. No. 14/463,548 can be replaced with security systems 202c, 202d, and 202e. Security systems 202c, 202d, and 202e can be used in the context of the security systems described in any of the patent applications incorporated by reference.

Viewing Perspective

Many of the camera assemblies described herein can be mounted in diverse orientations. The mounting orientations might not be ideal viewing orientations. Embodiments can include changing the viewing orientations (e.g., viewing angles) via software (e.g., an "app") and/or via a user interface 240 on a display screen 242 of a computing device 204 (see FIG. 2).

Cameras can be mounted in a lamp, jutting out of a wall (e.g., horizontally), and upside down (e.g., hanging down from a ceiling). The software and/or user interface 240 can enable users to select a button to adjust the viewing orientation a certain amount (e.g., 90 degrees).

Figure 15:
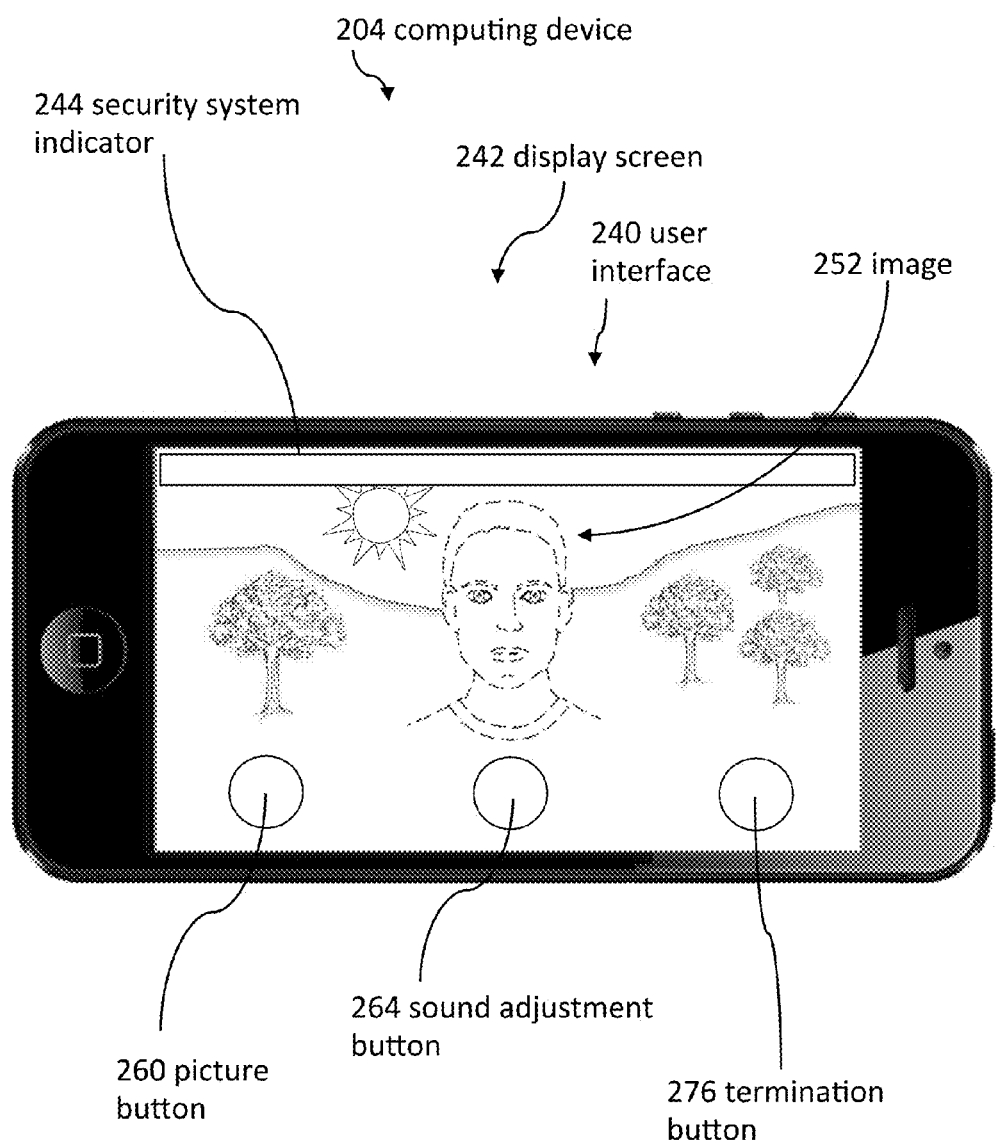
FIGS. 15 and 16 illustrate a user interface with an adjustable viewing orientation, according to some embodiments.
Figure 16:
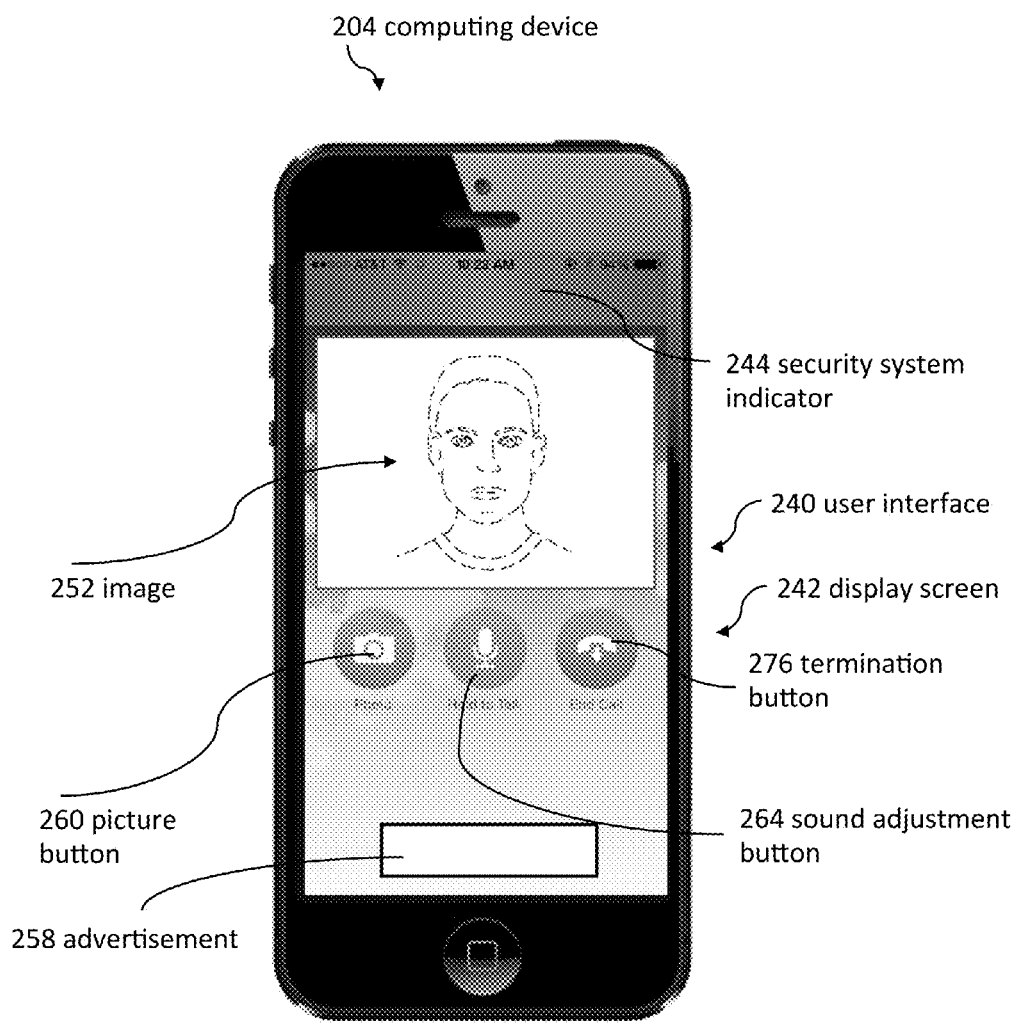

FIG. 15 illustrates a user interface 240. The image 252 in FIG. 15 is oriented as a landscape, which can span entire viewing portion of the display screen 242 of the remote computing device 204. The user can adjust the viewing orientation by selecting an orientation button (not shown), or simply by rotating the remote computing device 204 to the position of the desired orientation (e.g. if you want to view portrait, just the remote computing device rotate by ninety degrees as shown in FIG. 16). Accordingly, in some embodiments, selecting the orientation button shifts the image 252 ninety degrees. FIG. 16 illustrates the new orientation of the image 252 after selecting the orientation button, or rotating the remote computing device 204 to the desired orientation.

In some embodiments, the security system automatically detects the orientation in which the camera is inserted into a light socket. The security system can then automatically adjust the viewing orientation in response to the detected orientation (e.g., so the image 252 appears right-side up). The security system can detect the inserted orientation via an accelerometer 274.

Visitor Identification Embodiments

Many embodiments may utilize the visitor identification abilities of the person using the remote computing device 204 (shown in FIG. 1a). Various technologies, however, can be used to help the user of the remote computing device 204 to identify the visitor. Some embodiments use automated visitor identification that does not rely on the user, some embodiments use various technologies to help the user identify the visitor, and some embodiments display images and information (e.g., a guest name) to the user, but otherwise do not help the user identify the visitor.

Referring now to FIG. 1a, the camera assembly 208 can be configured to visually identify visitors through machine vision and/or image recognition. For example, the camera assembly 208 can take an image of the visitor. Software run by any portion of the system can then compare select facial features from the image to a facial database. In some embodiments, the select facial features include dimensions based on facial landmarks. For example, the distance between a visitor's eyes; the triangular shape between the eyes and nose; and the width of the mouth can be used to characterize a visitor and then to compare the visitor's characterization to a database of characterization information to match the visitor's characterization to an identity (e.g., an individual's name, authorization status, and classification). Some embodiments use three-dimensional visitor identification methods.

Some embodiments include facial recognition such that the camera assembly 208 waits until the camera assembly 208 has a good view of the person located near the security system 202c and then captures an image of the person's face.

Several embodiments can establish a visitor's identity by detecting a signal from a device associated with the visitor (e.g., detecting the visitor's smartphone). Examples of such a signal include Bluetooth, WiFi, RFID, NFC, and/or cellular telephone transmissions.

Furthermore, many embodiments can identify an identity of a visitor and determine whether the visitor is authorized to be located in a predetermined location. For example, the light socket 650 may be located in a room inside a building 300. The security system 202c can determine whether the visitor is authorized to be located in the room. In response to determining that the visitor is not authorized to be located in the room, the security system 202c can transmit an alert to the remote computing device 204 to notify a user of the remote computing device 204 that the visitor is not authorized to be located in the room.

In some embodiments, the security system 202c may be located outside of a building 300, for example, near a swimming pool. Accordingly, the security system 202c may be used to determine the identity of the visitor and thereby determine whether the visitor is authorized to be located near the swimming pool. This may allow the user to monitor the swimming pool to determine if small children and/or any other unauthorized people approach the swimming pool. In effect, the security system 202c can be used as a safety monitor.

Furthermore, the security system 202c can also sound an audible message to warn the visitor that he or she is not authorized to be located in the room or outdoor area (e.g. swimming pool). For example, in response to determining that the visitor is not authorized to be located in the room or outdoor area, the security system 202c may broadcast a predetermined audible message, via the speaker 236 in the security system 202c, to notify the visitor that the visitor is not authorized to be located in the room or outdoor area. The security system 202c may also be configured to allow the user of the remote computing device 204 to speak to the visitor that is not authorized to be located in the room or outdoor area. For example, if the user's child has approached the swimming pool, the user may speak a message into the remote computing device 204, which may then be transmitted to the security system 202c and sounded via the speaker in the security system 202c (e.g. "Mitch, you are not allowed to be in the swimming pool after dark.").

Embodiments of the security system 202c, may also save a history of times when the visitor was detected in the room or outdoor area by the security system 202c. It should be appreciated that this may also be used for a variety of purposes. For example, the user may have a dog walker walk the user's dog when the user is gone at work. In this manner, the security system 202c may be configured to save a history of times when the dog walker arrives at the building 300, which may allow the user may be able to oversee and determine if the dog walker is walking the user's dog as promised. This may be helpful when the user pays the dog walker's invoice. The user can review the history to determine whether the dog walker's visits to the buildings match the invoiced dates. The person of ordinary skill in the art will recognize a variety of situations to utilize this technology.

As well, the security system 202c may take action in response to determining that the visitor is authorized to be located in the room. For example, the security system 202c may transmit a second alert to the remote computing device 204, wherein the second alert notifies the user of the remote computing device 204 that the visitor is located in the room.

In some embodiments, the second alert may also notify the user of the remote computing device 204 that the visitor is authorized to be located in the room.

In order to determine the identity of the visitor, the security system may utilize any technology capable of identifying a person or a remote computing device, such as facial recognition of a visitor, near field communication of a remote computing device 204 (e.g. identifying a remote computing device 204 associated with the visitor via Bluetooth), and the like.

Methods of Detecting Visitors

Figure 17:
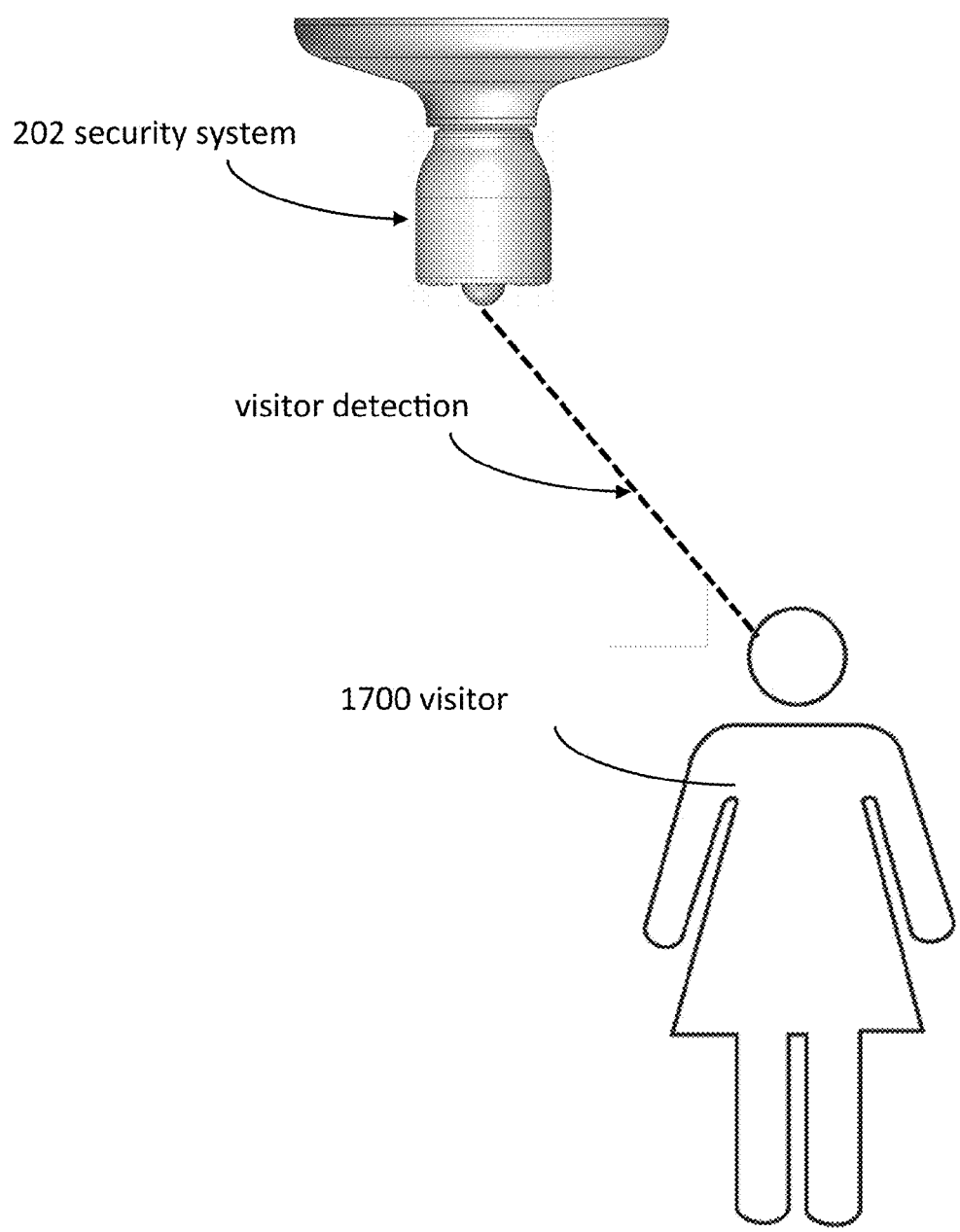
FIG. 17 illustrates a security system detecting a visitor, according to some embodiments.
Figure 18:
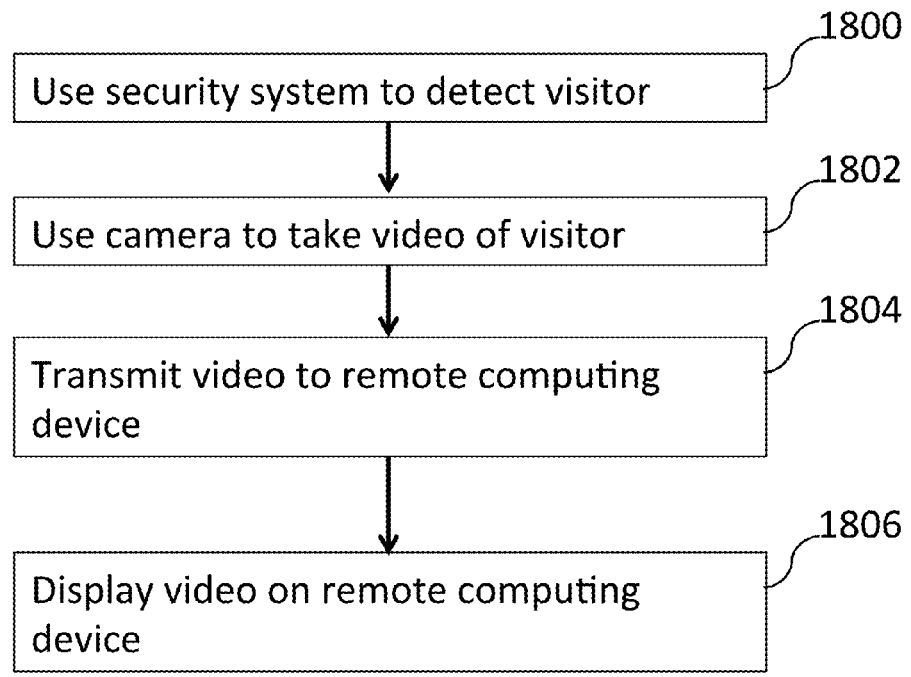
FIGS. 18-27 illustrate flow-charts of various methods of using a security system, according to various embodiments.

It should be appreciated that this disclosure includes a variety of methods of using the security system to detect visitors, like the visitor 1700 shown in FIG. 17. For example, as illustrated in FIG. 18, some methods include using the security system 202 to detect a visitor (at step 1800), and using the camera to take video of the visitor (at step 1802). As well, some embodiments include transmitting the video to a remote computing device 204 (at step 1804) and displaying the video on the remote computing device 204 (at step 1806). This may effectively allow a remote user to monitor the activity around the security system 202.

Figure 19:
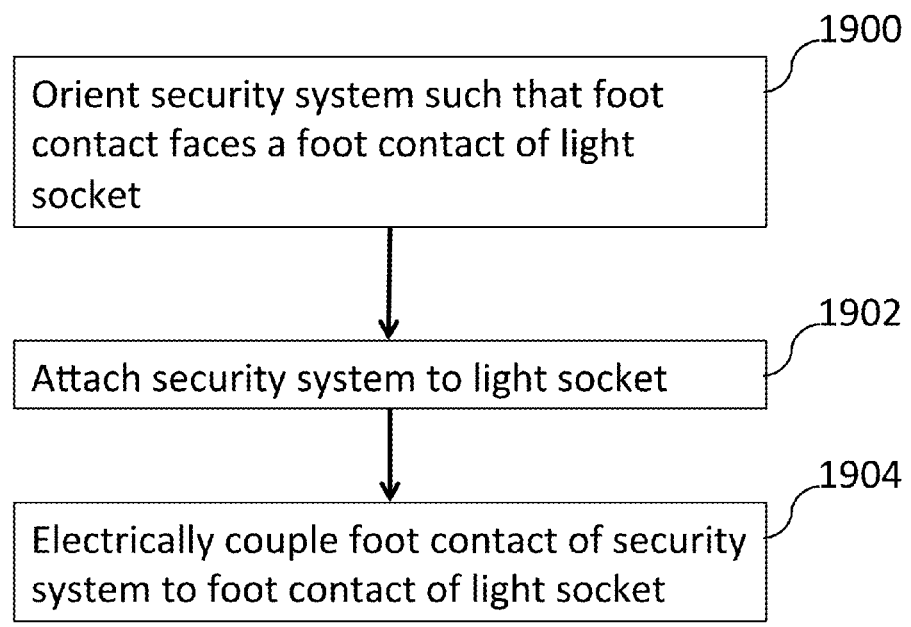

As shown in FIG. 19, some methods may include orienting the security system 202 such that the foot contact 618 of the security system 202 faces a foot contact 654 of the light socket 650 (at step 1900). FIG. 19 further illustrates a method that may include attaching the security system 202 to the light socket 650 (at step 1902) and electrically coupling foot contact 618 of the security system 202 to the foot contact 654 of the light socket 650. This electrical coupling may thereby energize the security system 202 to power all of the onboard components.

Figure 20:
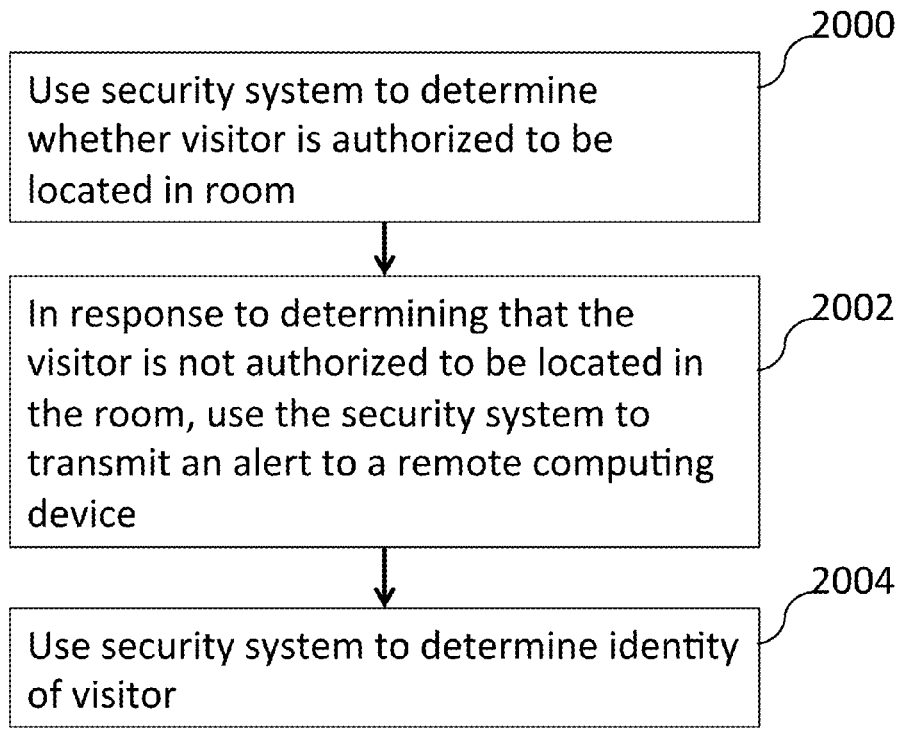

FIG. 20 shows a method that includes using the security system 202 to determine whether the visitor is authorized to be located in a room or in a space that the security system 202 is monitoring (at step 2000). In response to determining that the visitor is not authorized to be located in the room or the space, the method may further include using the security system 202 to transmit an alert to a remote computing device 204 (at step 2002). The alert may be a warning message, such as a text message or email, which warns the user that the unauthorized visitor is located in the room or space. Accordingly, some methods may further include using the security system 202 to determine the identity of the visitor, for example, via facial recognition or detecting a smart phone through NFC (at step 2004). As well, the identity of the visitor may be included in the alert that is sent to the remote user. For example, if the security system detects an unauthorized user, such as a toddler, near a swimming pool, the alert might say, "Timmy is located near the pool."

Figure 21:
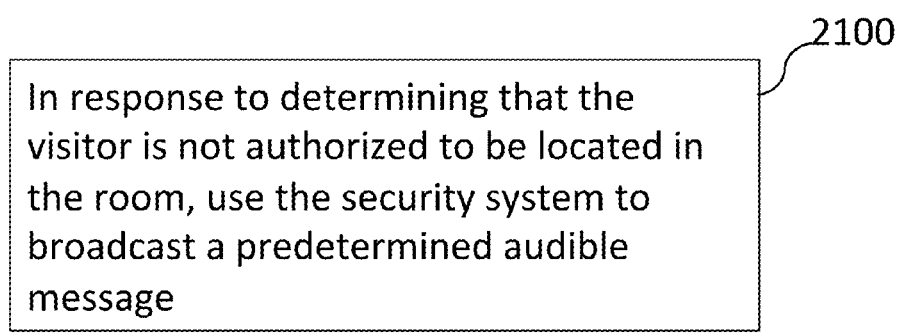
Figure 22:
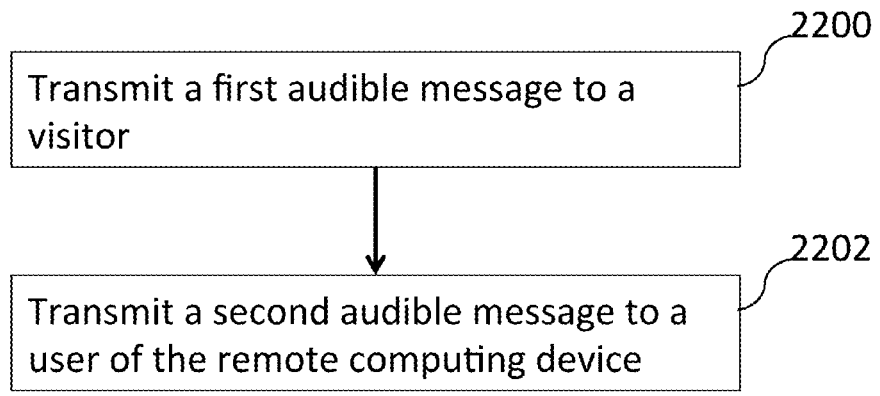
Figure 23:
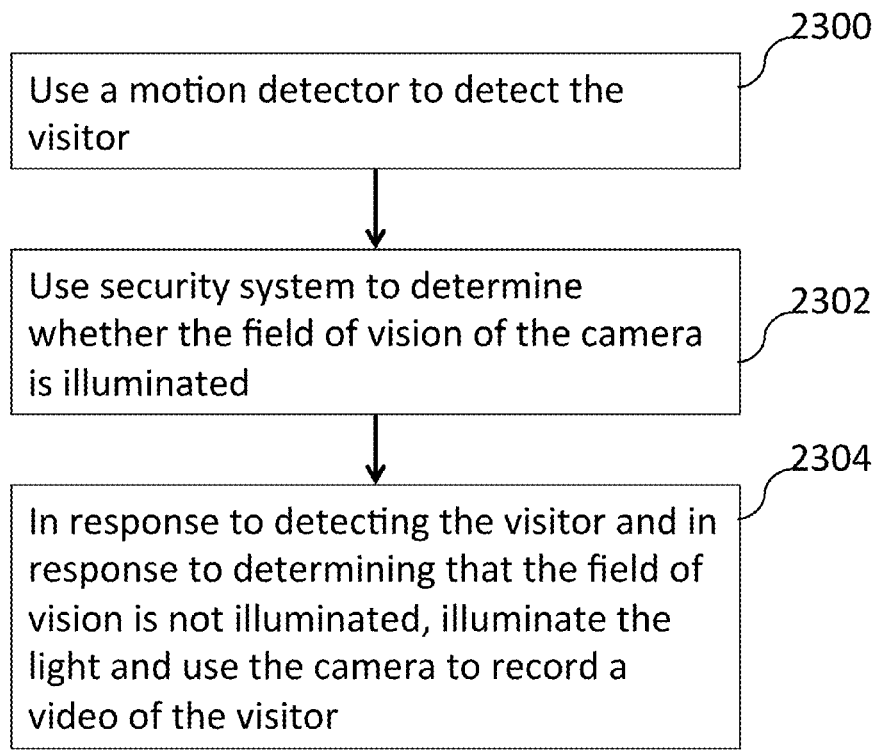

As shown in FIG. 21, in response to determining that the visitor is not authorized to be located in the room or space, such as near or in the swimming pool, some methods may further include using the security system to broadcast a predetermined audible message (at step 2100). Using the example in the previous paragraph to further illustrate, when the security system 202 detects the toddler near the swimming pool, the security system 202 might sound an audible message via the speaker 236, such as, "PLEASE MOVE AWAY FROM THE POOL!"

Various methods may enable the visitor and remote user to communicate to each other through the security system 202. For example, some methods may include transmitting a first audible message to a visitor (at step 2200). In execution, the first audible message may be received by a microphone 234 in the remote computing device 204 and transmitted to the security system 202. As well, the first audible message may be audibly transmitted to the visitor via the speaker 236 in the security system 202. As well, methods may include transmitting a second audible message to a user of the remote computing device 204 (at step 2202). The second audible message may be received by the microphone 234 in the security system 202 and transmitted to the remote computing device 204. The second audible message may be audibly transmitted to the user via a speaker 236 in the remote computing device 204.

As well, methods may include using the motion detector 218 to detect the visitor (at step 2300) and using the security system 202 to determine whether the field of vision of the camera is illuminated (at step 2302). In response to detecting the visitor and in response to determining that the field of vision is not illuminated, the method may further include illuminating the light 626 and/or 630 and using the camera 208 to record a video of the visitor (at step 2304).

Figure 24:
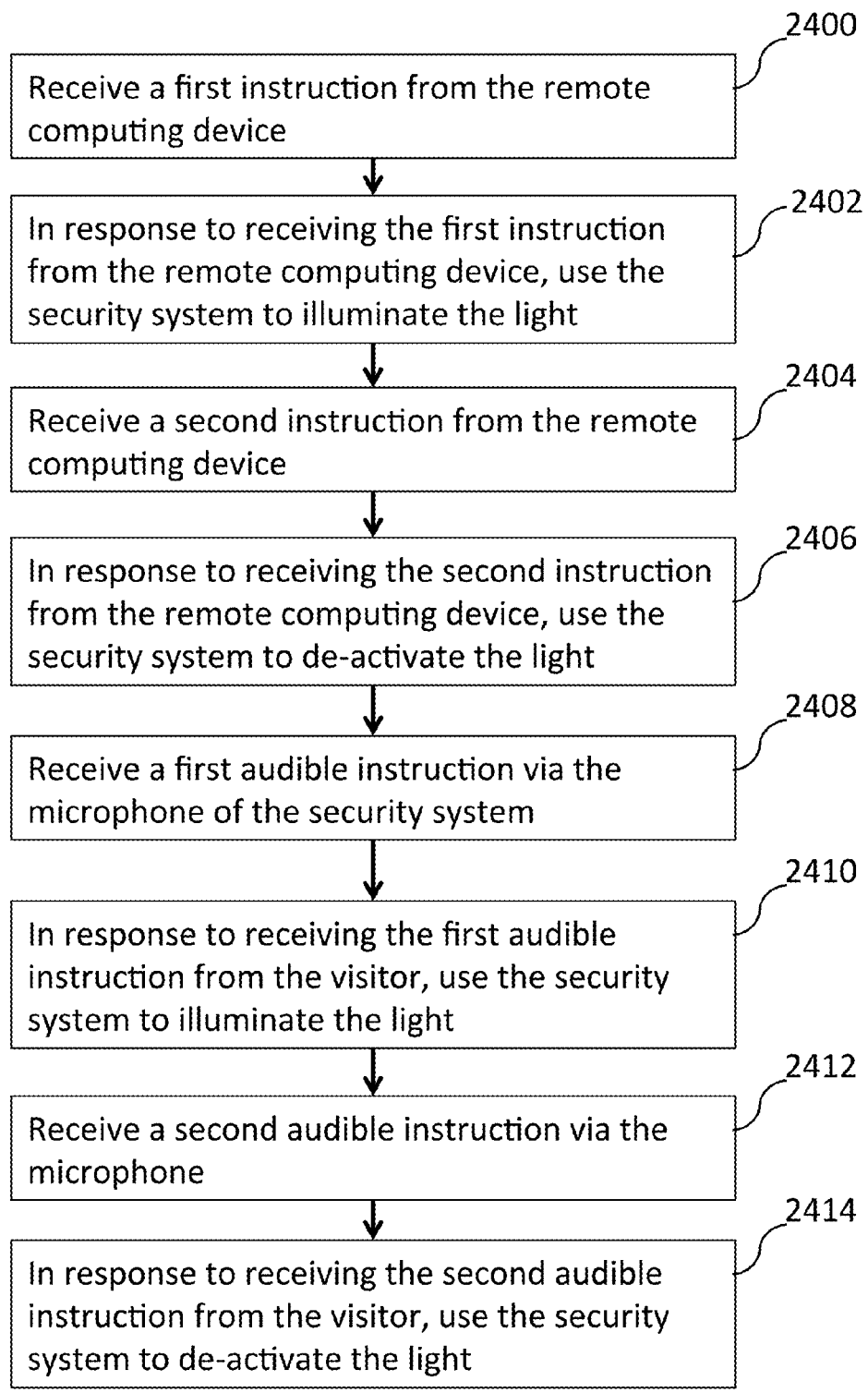

As illustrated in FIG. 24, methods may include receiving a first instruction from the remote computing device (at step 2400). In response to receiving the first instruction from the remote computing device 204, methods may include using the security system 202 to illuminate the light (at step 2402). As well, some methods may include receiving a second instruction from the remote computing device 204 (at step 2404). In response to receiving the second instruction from the remote computing device 204, methods may include using the security system 202 to de-activate the light 626 and/or 630 (at step 2406). Methods may also include receiving a first audible instruction via the microphone 234 of the security system 202 (at step 2408), and in response to receiving the first audible instruction from the visitor, the method may include using the security system 202 to illuminate the light 626 and/or 630 (at step 2410). As well, some methods may include receiving a second audible instruction via the microphone 234 of the security system 202 (at step 2412) and in response to receiving the second audible instruction from the visitor, the method may include using the security system 202 to de-activate the light 626 and/or 630 (at step 2414).

Figure 25:
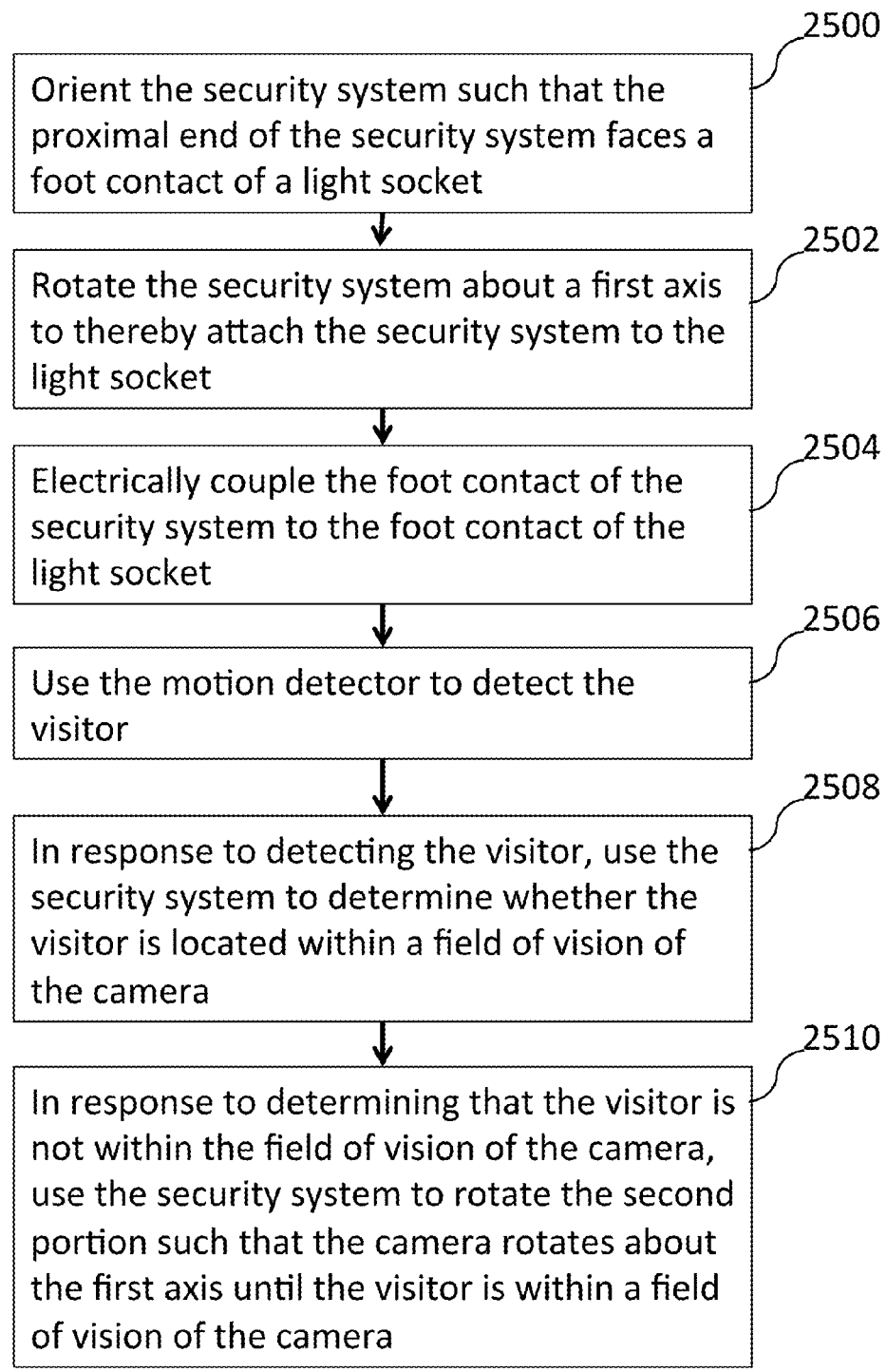

FIG. 25 illustrates a method that includes orienting the security system 202 such that the proximal end 280 of the security system 202 faces a foot contact 654 of a light socket 650 (at step 2500) and thereby rotating the security system 202 about a first axis 266 to thereby attach the security system 202 to the light socket 650 (at step 2502). The method may also include electrically coupling the foot contact 618 of the security system 202 to the foot contact 654 of the light socket 650 (at step 2504). Methods may include using the motion detector 218 to detect the visitor (at step 2506) and in response to detecting the visitor, the methods may include using the security system 202 to determine whether the visitor is located within a field of vision 238 of the camera 208 (at step 2508). In response to determining that the visitor is not within the field of vision 238 of the camera 208, methods may include using the security system 202 to rotate the second portion such that the camera 208 rotates about the first axis 266 until the visitor is within a field of vision 238 of the camera 208 (at step 2510).

Figure 26:
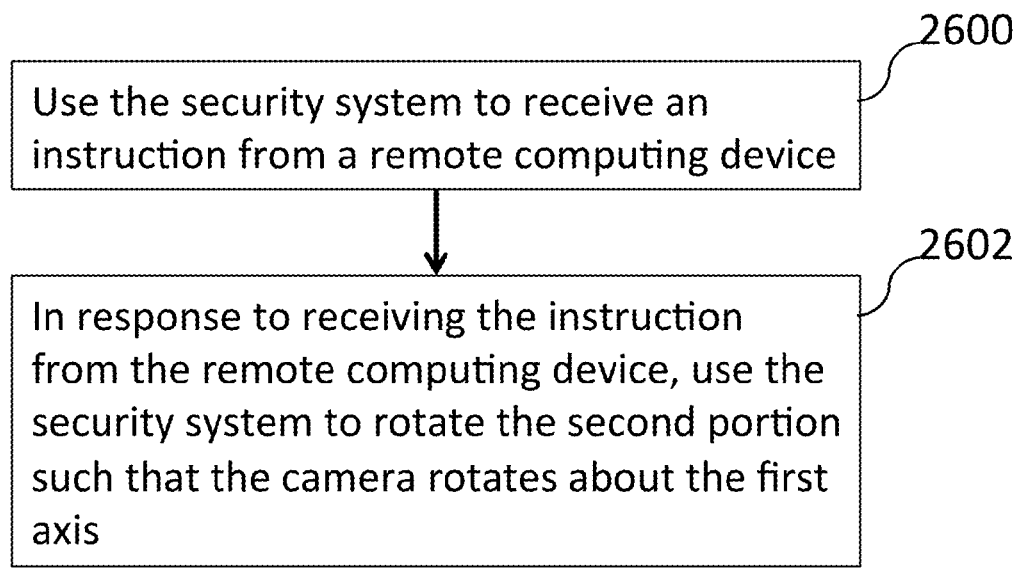
Figure 27:
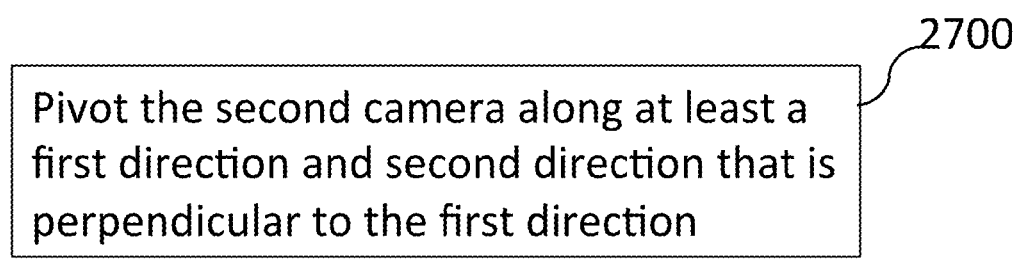

Furthermore, as shown in FIG. 26, methods may include using the security system 202 to receive an instruction from a remote computing device 204 (at step 2600). The instruction may comprise a command to rotate the second portion, or camera rotatable housing 658. In response to receiving the instruction from the remote computing device 204, the method may include using the security system 204 to rotate the second portion such that the camera 208 rotates about the first axis 266 (at step 2602). As well, as illustrated in FIG. 27, some methods may include a first and second camera, and the methods associated may thereby include pivoting the second camera along at least a first direction and a second direction that is perpendicular to the first direction (at step 2700).

Detecting Adverse Sounds

The security system 202, or light socket camera, may also be configured to monitor a space by audibly detecting various sounds within the space. The sounds may be adverse sounds, which may include breaking glass, gunshots, shouting, screaming, and the like. In response to detecting the adverse sound(s) via the microphone 234, the security system 202 may be configured to notify a party of the adverse sound(s). It should be appreciated that the adverse sound may comprise any type of sound to indicate that someone or something is in need of help, that a problem has occurred, a crime is being committed, and the like.

As illustrated in FIGS. 28a, 28b, 29 and 30, the disclosure includes a method for detecting an adverse sound 2800 (at step 2900). In response to detecting 2801 the adverse sound 2800, the method may include using the security system 202 to notify a party 2804 (at step 2902). The party 2804 to be notified may be any party that a user of the security system 202 may wish to contact, such as the user herself, or any contact listed on the user's contact list, such as a contact list stored within the user's remote computing device 204. As well, the party 2804 may be an emergency dispatcher, such as a 9-1-1 dispatcher (in the U.S.) or a dispatcher who responds to any emergency (in the U.S. or any other country). Generally, it should be appreciated that the party 2804 may be any party who may be interested in the occurrence of the adverse sound 2800.

The security system 202 may notify the party 2804 by sending a notification from the security system 202 to a computing device 204 associated with the party 2804. The security system 202 may transmit the notification through any wireless or wired technology. For example, the computing device 204 may receive the notification via a wireless technology such as radio frequency, WiFi (e.g., wireless local area network), cellular, Internet, Bluetooth, telecommunication, electromagnetic, infrared, light, sonic, and microwave. In this manner, the security system 202 may wirelessly communicate with the computing device 204 via the communication module 262 of the security system 202, which may be configured to connect to a wireless communication network. Furthermore, the security system 202 may transmit the notification through a wired technology, such as through the copper wires within the building 300, which may comprise a wired network. As well, the wired technology may include fiber-optics, Ethernet, telephone (e.g. digital subscribe line "DSL"), cable, and the like.

Figure 28A:
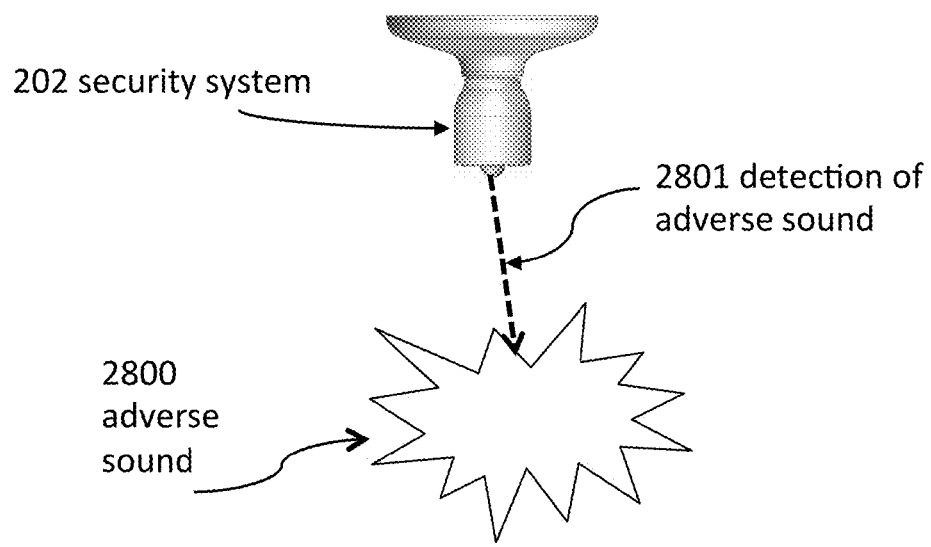
FIG. 28a illustrates a security system detecting a sound, according to an embodiment.
Figure 28B:
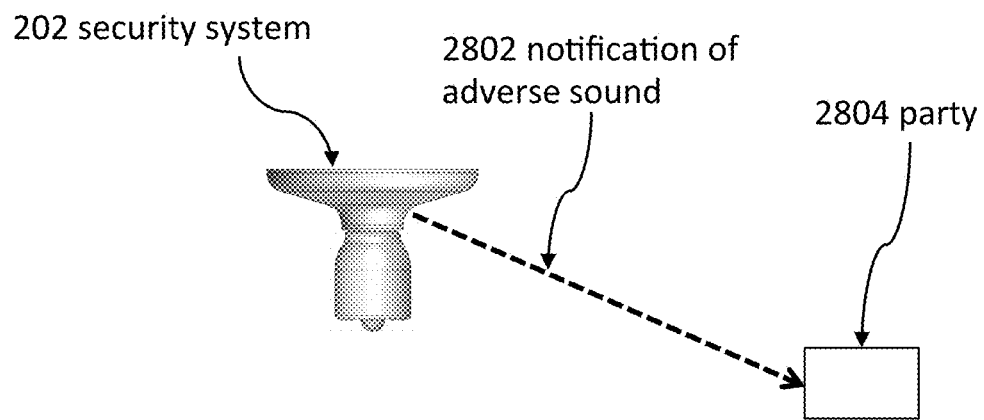
FIGS. 28b-28f illustrate various responses to detecting the sound from FIG. 28a, according to various embodiments.
Figure 28C:
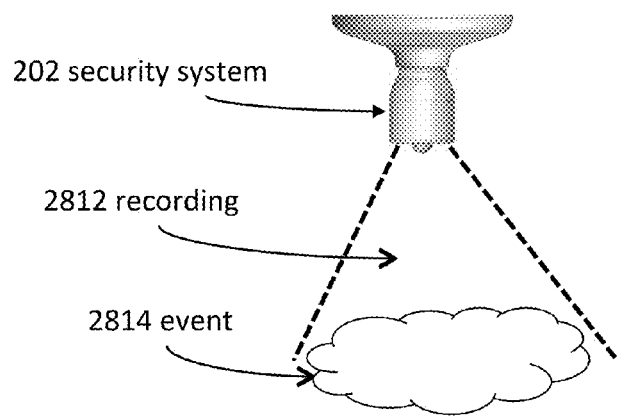
Figure 28D:
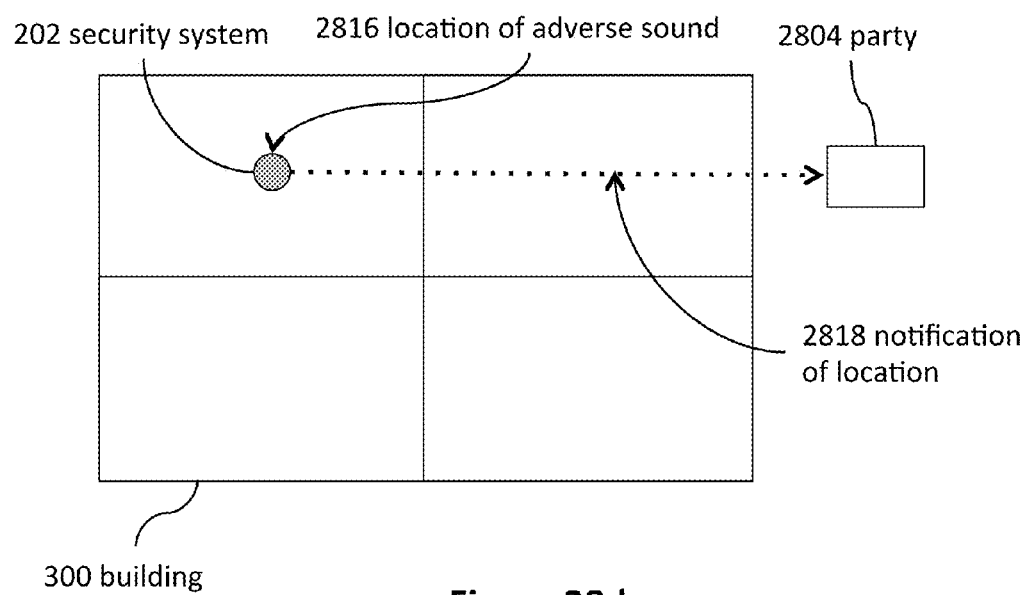

As well, in response to detecting the adverse sound 2800, the method may further include using the camera 208 of the security system 202 to record one of an audio and video of an area adjacent the security system 202. As shown in FIG. 28c, upon the security system 202 detecting the adverse sound, the security system 202 may then capture a video or an audio recording 2812 of an event 2814 in an area adjacent the adverse sound 2800. The video and/or audio may be entered as evidence for a criminal investigation, or to determine liability in the event of a personal injury lawsuit. Upon capturing one of the audio and/or video, the method may further include transmitting the audio and/or video to the remote computing device 204.

Aside from documenting the area adjacent the adverse sound 2800, the security system 202 may also audibly sound a warning message through the speaker 236. The warning message may be an audible warning to alert any person or animal within the area of the adverse sound 2800 to leave the area or perhaps that help is on the way. Once the warning message has been sounded, two-way communication may be conducted between a user of a remote computing device 204, who is remotely located from the adverse sound 2800, and a person or animal located nearby the adverse sound 2800. In this manner, if a person is hurt on the ground near where the adverse sound was detected, the user may alert the hurt person that help is en route. It should also be appreciated that in response to detecting the adverse sound 2800, the security system 202 may perform any other function such as flashing a warning light, perhaps to scare away perpetrators.

The security system 202 may also be configured to determine logistical information, which may be helpful to an emergency dispatcher. For example, in response to the adverse sound 2800, the security system 202 may determine a location of the adverse sound 2800 with respect to its location inside or outside of the building 300. In response to determining the location of the adverse sound 2800, the security system 202 may transmit a notification of the location 2818 of the adverse sound 2800 to the party 2804. This may be helpful to emergency personal in order to locate the site of the adverse sound 2800, which may indicate the location of the victim, perpetrator, etc.

Figure 28E:
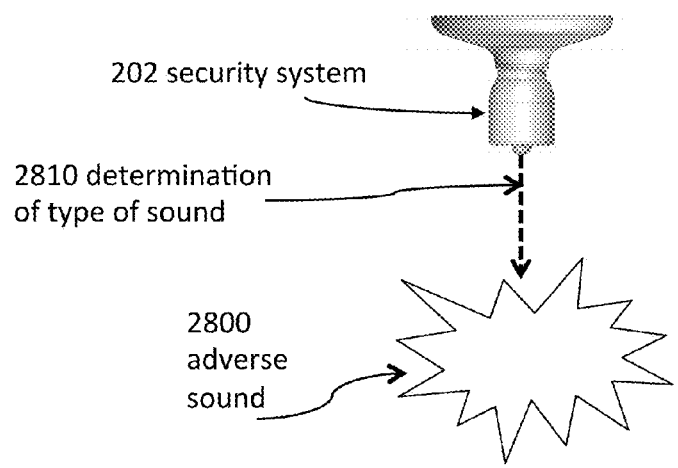

With reference to FIG. 28e, the method may include determining a type of the adverse sound 2800, such as determining whether the adverse sound 2800 comprises a gunshot, scream, etc. In this regard, the security system 202 may include an internal processor to digitally analyze the adverse sound 2800 to determine the type of adverse sound. In some embodiments, the security system 202 may transmit a digital signal, which represents the adverse sound 2800, to an external processor to be digitally analyzed to determine the type of adverse sound. Upon determining the type of adverse sound 2800, the type of adverse sound 2800 may then be communicated to the party 2804, via the remote computing device 204. It should be appreciated that the notification as sent to the remote computing device 204 may be a text message, a phone call (such as a pre-recorded message), or any type of communication that notifies the party 2804 of the adverse sound 2800 and/or the type of the adverse sound.

As well, the security system 202 may also be configured to determine other biographical information such as a time of day that the adverse sound 2800 was detected. In response to determining the time of day of the adverse sound 2800, transmitting a notification of the time of day to the party 2804.

Figure 28F:
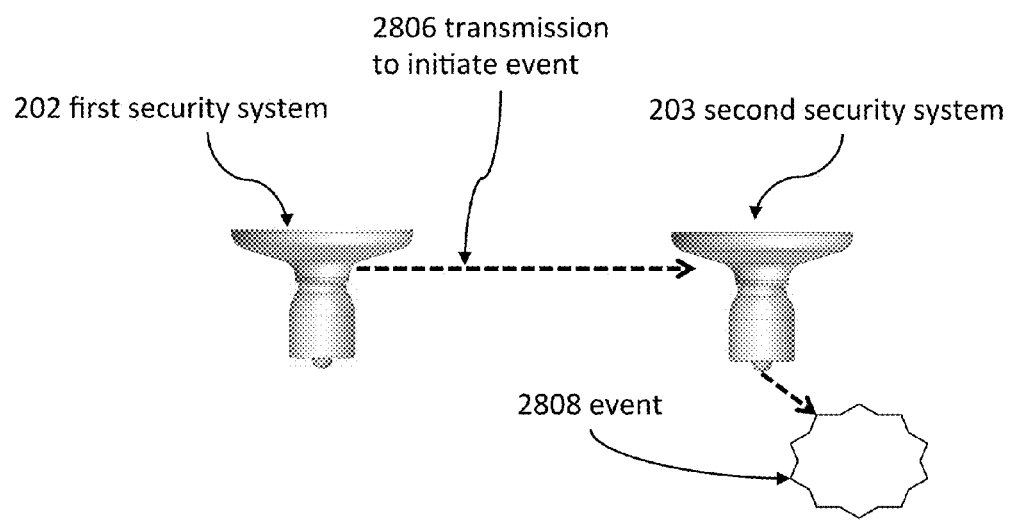
Figure 29:
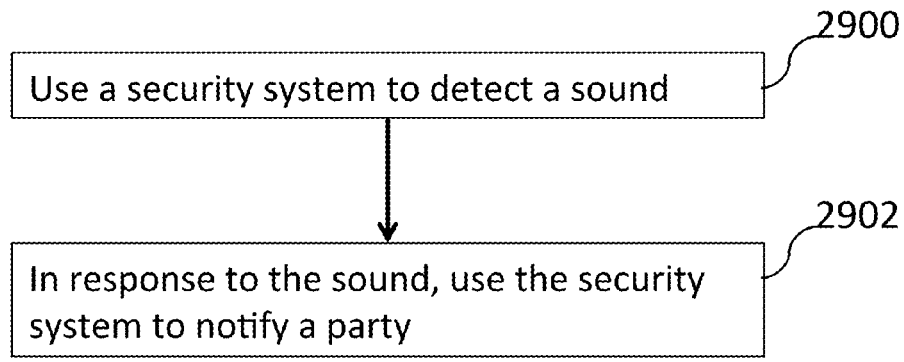
FIGS. 29 and 30 illustrate flow-charts of various methods of using a security system, according to various embodiments.
Figure 30:
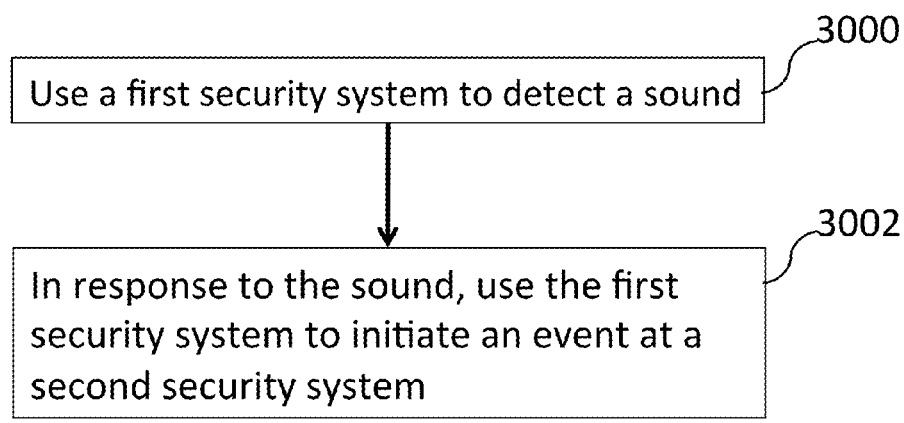

As illustrated in FIG. 28f, methods may include interaction between two security systems, whereby a first security system 202 notifies a second security system 203 of the adverse sound 2800. For example, in response to detecting the adverse sound 2800, the method may include using the first security system 202 to initiate an event at a second security system 203 communicatively coupled to the first security system 202.

The second security system 203 may perform any event that may be performed by the first security system 202. For example, the second security system 203 may sound an audible message through a speaker 236 of the second security system 203. As well, the second security system 203 may flash a warning light, such as an LED, located on the second security system 203.

In response to either sounding the audible message or flashing the warning light, the second security system 203 may also be configured to use a motion detector of the second security system 203 to detect a motion of a user within an area of the second security system 203. In this manner, the first security system 202, via the second security system 203, may detect whether the user responds to the event or notification of the adverse sound 2800 as detected by the first security system 202. If the second security system 203 does not detect motion of the user, the first security system 202 may initiate other events, such as an event at a third security system, not shown, or an event at a remote computing device 204, such as a text message at a remote computing device 204. The first security system 202 may continue initiating events until the first security system 202 receives confirmation that a user is aware of the adverse sound 2800 as detected by the first security system 202.

The second security system 203 may also audibly project, via the speaker 236, specific information relating to the adverse sound 2800 as detected by the first security system 202. As such, the first security system 202 may be communicatively coupled to the second security system 203, and the first security system 202 may communicate information to the second security system 203, such as the type of adverse sound 2800, the location of the sound, time, etc. For example, in response to a window pane being broken at a back door, the second security system 203 may project a message, "Broken glass detected at the back door!" In this regard, the second security system 203 may notify a user of the type of adverse sound detected, and also the location of the adverse sound.

As well, because the first security system 202 may be configured to determine and distinguish various types of sounds, the first security system 202 may also initiate specific events in response to the type of sound detected. For example, the security system 202 may determine whether the adverse sound 2800 is a first sound or a second sound. In response to determining the adverse sound 2800 is the first sound, the first security system 202 may be configured to initiate a first event at the first security system 202 and/or the second security system 203. In response to determining the adverse sound 2800 is the second sound, the first security system 202 may be configured to initiate a second event at the first security system 202 and/or the second security system 203. It should be appreciated that the second event may be different than the first event. For example, the first sound may be a shouting noise and the first event may comprise flashing a warning light of the first security system 202 and/or the second security system 203. As well, the second sound may be breaking glass and the second event may comprise sounding an audible alarm.

Generally, it should be appreciated that the first security system 202 may be configured to perform specific events in response to specific adverse sounds, as well as instructing the second security system 203 to perform specific events in response to detecting specific adverse sounds.

Moreover, in response to the first security system 202 detecting a first adverse sound, such as crashing noise, the first security system 202 may transmit a text message to the remote computing device 204 to notify the user of the first adverse sound. In response to the first security system 202 detecting a second adverse sound, such as a gunshot, the first security system 202 may notify an emergency dispatcher of the second adverse sound. Generally, in response to any type of adverse sound 2800, the first security system 202 may be configured to perform any of the actions described throughout this disclosure.

Triggering Appliances

Figure 34:
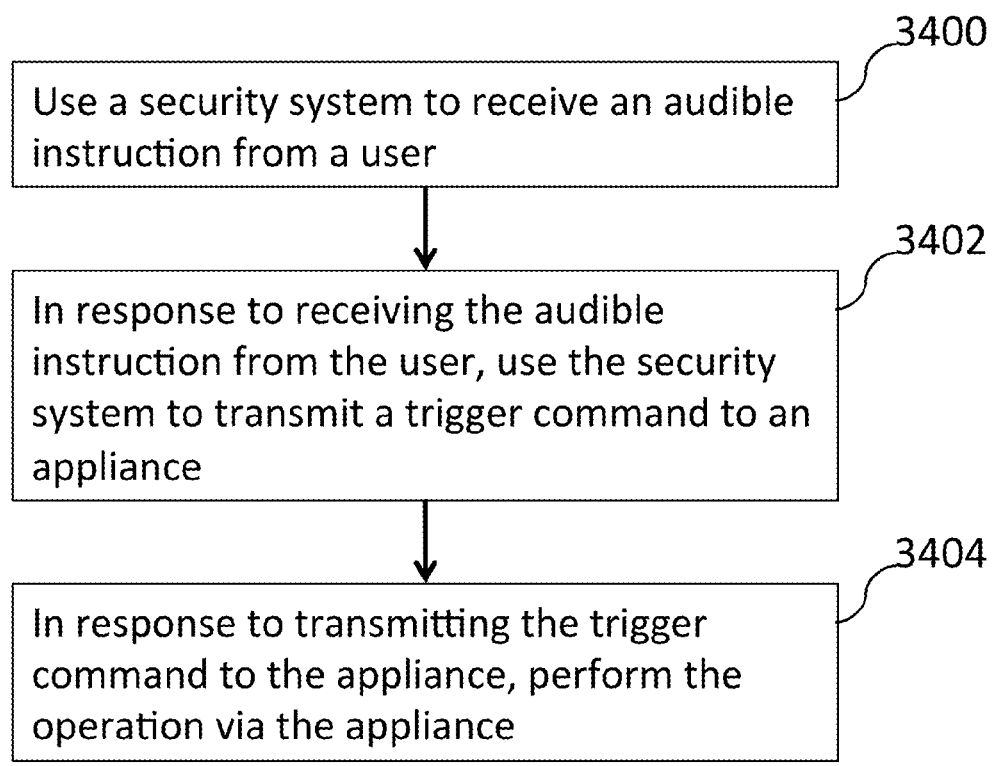
FIG. 34 illustrates a flow-chart of a method of using a security system, according to an embodiment.

With reference to FIG. 34, the security system 202, or light socket camera, may further be configured to receive instructions from a user (at step 3400), such as an audible instruction, and thereby trigger an appliance to perform an operation. For example, the user may audibly instruct the security system 202 to turn on a television. In this manner, the security system 202 may be configured to respond to a predetermined greeting, such as, "Hi Max" or "Hey Max," or a even predetermined name, such as, "Max." Audibly speaking the predetermined greeting or name can instruct the security system 202 to perform (via itself) or transmit a command to another appliance (at step 3402) to perform anything stated after the predetermined greeting or name. In response to transmitting the trigger command to the appliance, the method can also include performing the operation via the appliance (at step 3404). For example, if a user audibly says, "Hi Max, please unlock the front door," the security system 202 can transmit a command to a front door lock that is communicatively coupled to the security system 202. In response to the command being transmitted to the door lock, the door lock can then move to the unlocked position, or if the door lock is already in the unlocked position, the door lock can simply remain in that position.

Figure 31A:
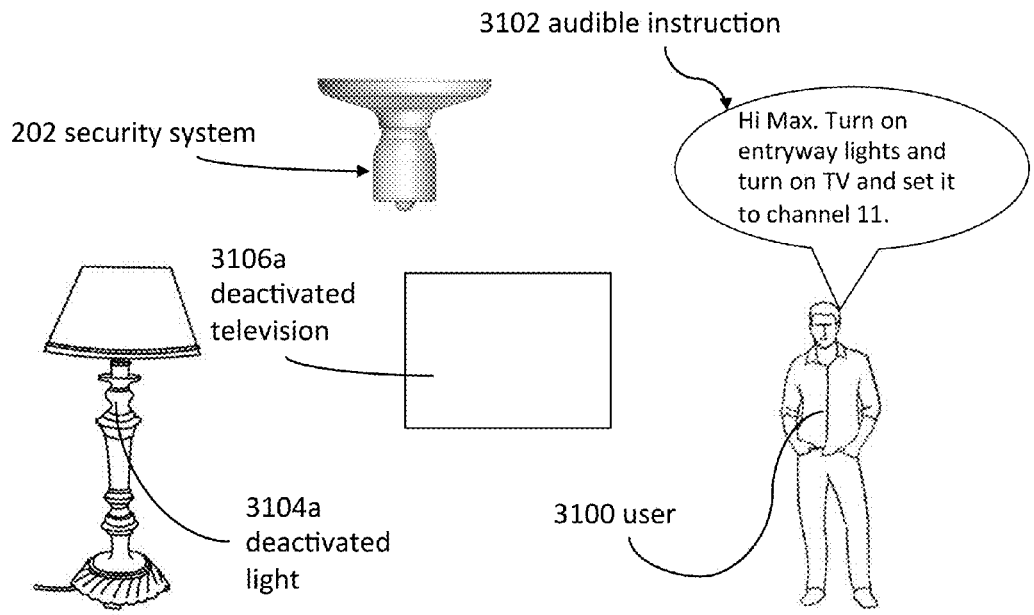
FIG. 31a illustrates a security system detecting an audible instruction, according to an embodiment.
Figure 31B:
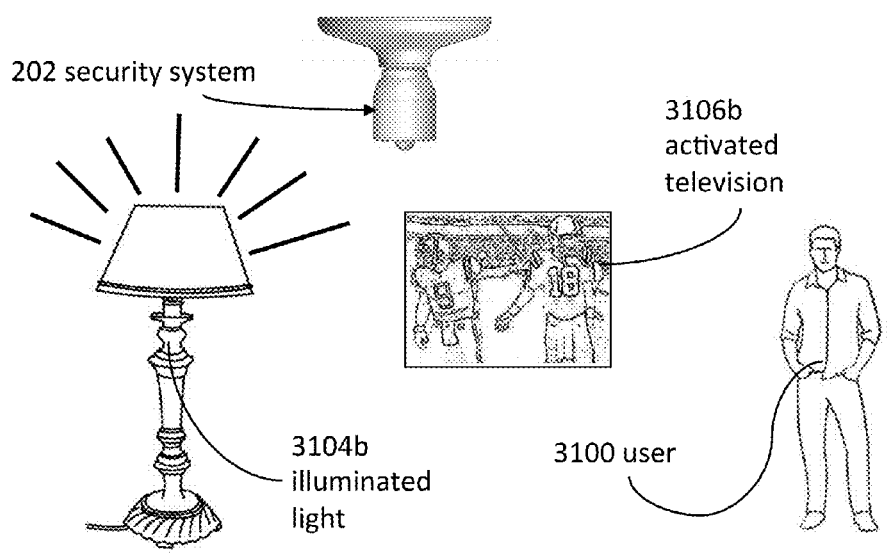
FIGS. 31b-31f illustrate various responses to detecting the audible instruction from FIG. 31a, according to various embodiments.
Figure 31C:
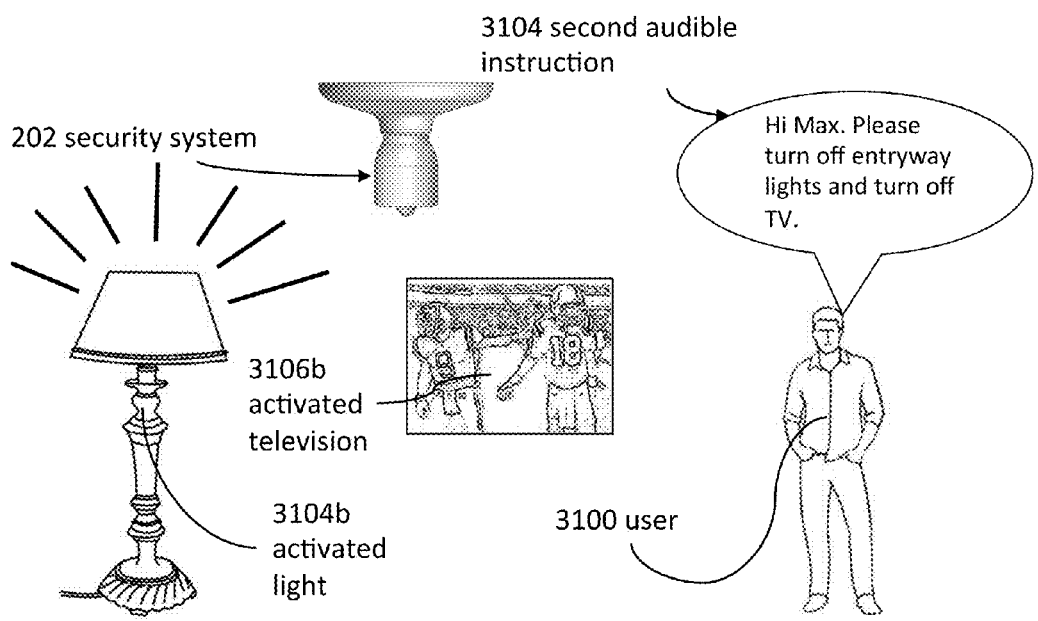
Figure 31D:
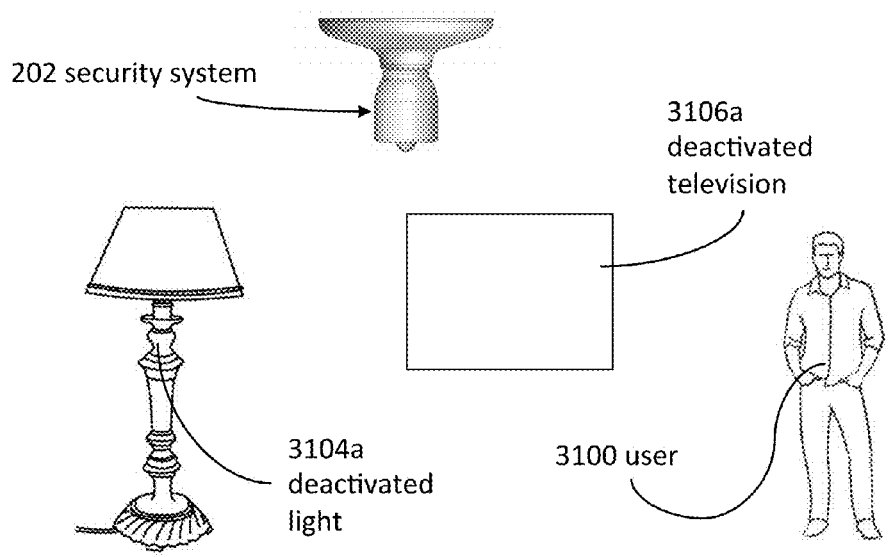

FIGS. 31*a*-31*d* illustrate just one of the many examples of how the security system 202 may be used to receive an audible instruction 3102 from a user 3100. As shown in FIGS. 31*a* and 31*b*, the user 3100 may audibly speak an instruction 3102, such as "Hi Max. Turn on entryway lights and turn on TV and set it to channel 11." The audible instruction 3102 may be received by the security system 202, at which point it may transmit commands to various appliances. For example, the deactivated television 3106*a* may become activated (activated television 3106*b*) through a command sent via a wireless or wired connection to the television. Accordingly, the television 3106*b* may set it's input channel to channel 11, in response to the user's audible instruction 3102. As well, the deactivated light 3104*a* light may become illuminated 3104*b* via the command. Accordingly, the security system 202 may also deactivate the television 3106 and light 3104 as shown in FIGS. 31*c* and 31*d*.

Generally, it should be appreciated that the term "operation" can be broadly defined. For example, the term "operation" can include activate, deactivate, illuminate, begin, stop, end, change, pause, record, identify, run, make, detect, and the like. In this regard, the security system 202 can control any number of appliances to perform any type of operation that is within the normal use of the appliance.

Furthermore, the appliance can be any type of appliance that is communicatively coupled to the security system 202 via a wireless connection or a wired connection. For example, the appliance can be a light, lamp, shower, faucet, dishwasher, door lock, garage door opener, door, fan, ceiling fan, coffee maker, alarm clock, stereo, television, digital video recorder, cable box, digital video disc player, compact disc player, toaster, oven, range, microwave, streaming media player (such as Apple TV), HVAC system (heating, ventilating and air conditioning system), telephone, fax machine, shredder, blender, juicer, space heater, thermostat, camera (such as a nanny camera), power tool (such as a table saw, drill, chain saw, etc.), smoke alarm, a second security system 202 (such as a second light socket camera, or a security system that can be plugged directly into a wall outlet), and any appliance that may be electrically coupled to a building or any appliance that may be communicatively coupled to the security system 202. Specific examples of appliance operations may include closing and/or opening a garage door, turning on and/or turning off a television, pausing a television, setting an input channel of a television to any desired station, changing television volume, making a cup of coffee via a coffee maker, setting a thermostat to a predetermined temperature, unlocking and/or locking a door lock, and the like.

Figure 31E:
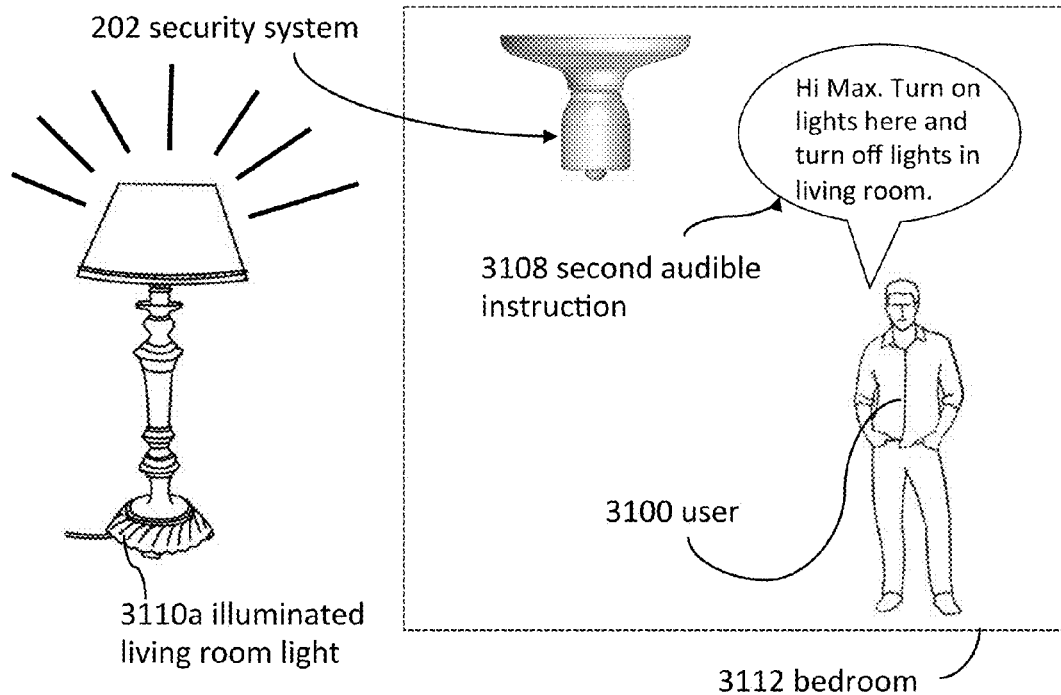
Figure 31F:
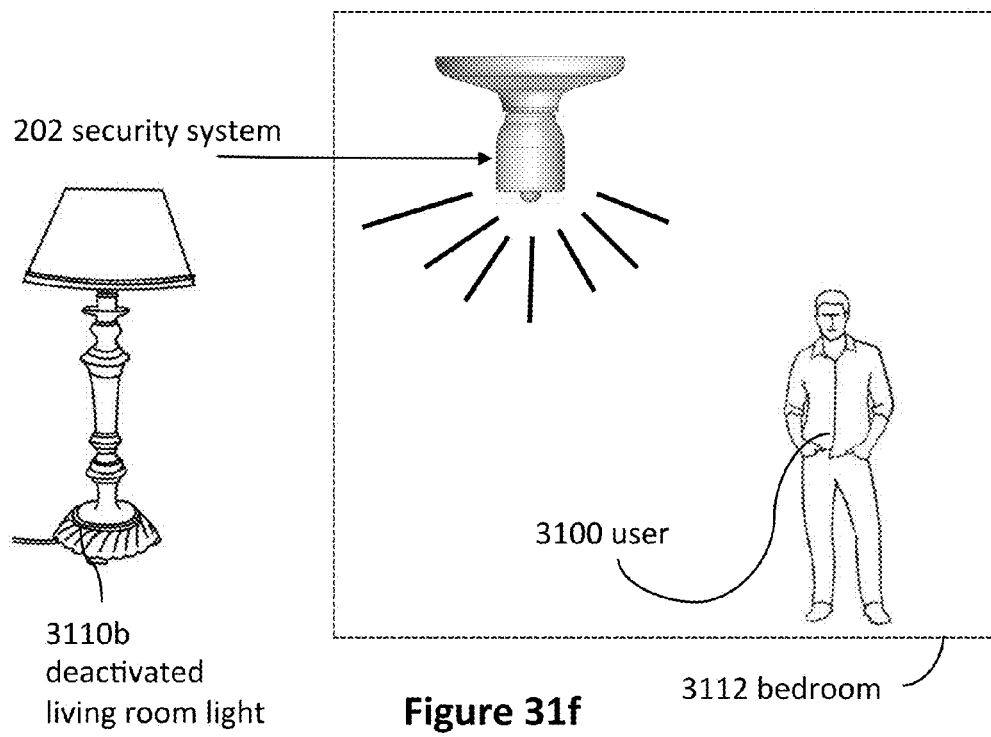

As shown in FIGS. 31*e* and 31*f*, the security system 202 may trigger appliances located in different places throughout the house. For example, the security system 202 may receive a second audible instruction 3108, and in response to the instruction 3108, the security system 202 may activate an appliance, such as a light on the security system 202, within the same room, such as bedroom 3112, and also another appliance, such as living room light 3110, located in a different room. In this regard, the security system 202 may be configured to control multiple appliances simultaneously, all the while the appliances may be located in the same location or different locations. As long as the appliances are communicatively coupled to the security system 202, then the appliance can be located anywhere.

Figure 32A:
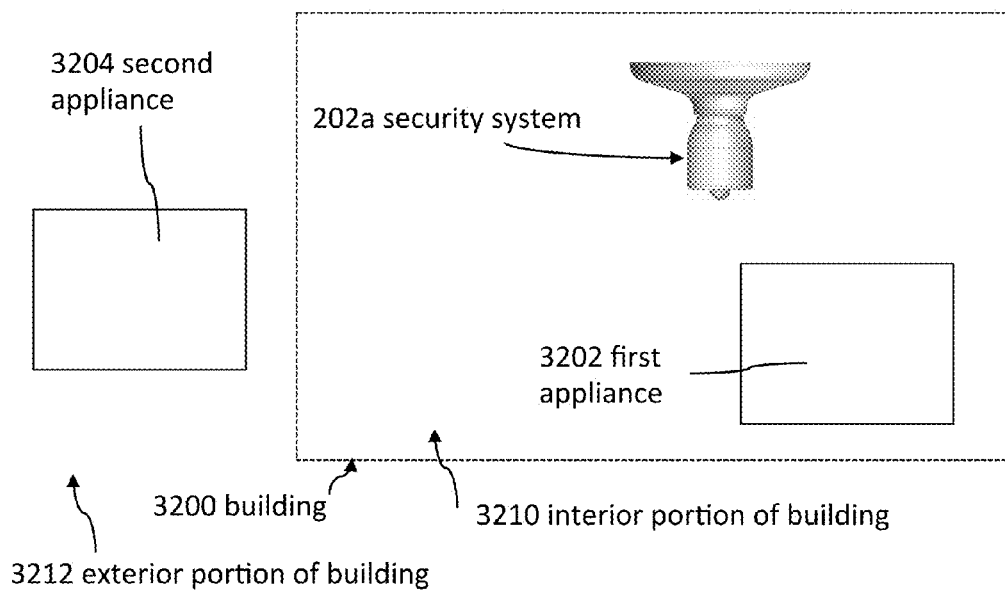
FIGS. 32a and 32b illustrate various embodiments of a security system, first appliance and second appliance being located inside or outside a building, according to various embodiments.
Figure 32B:
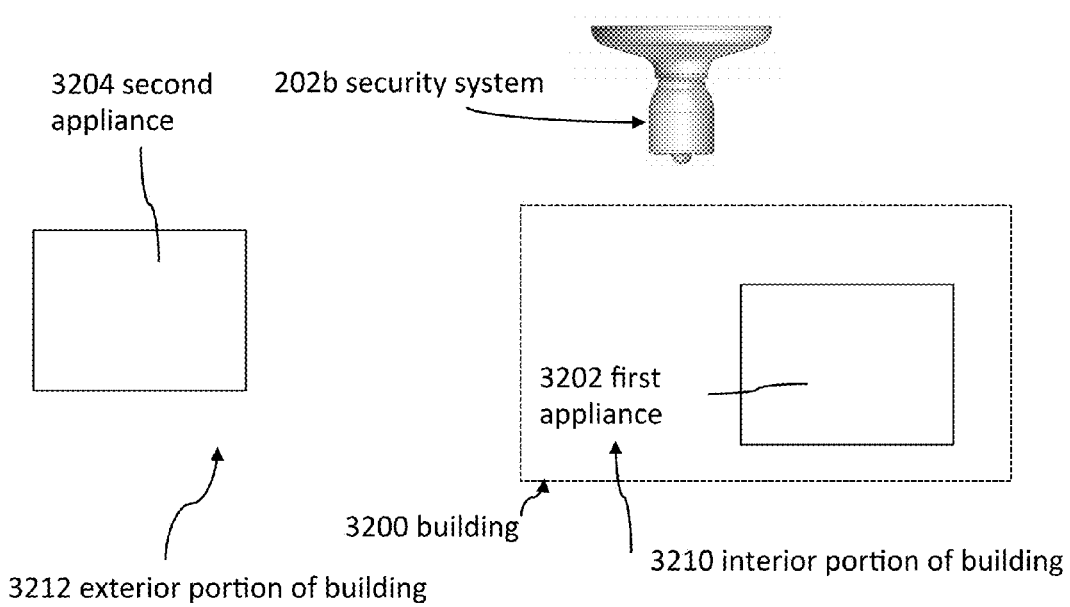

With reference to FIGS. 32a and 32b, the security system 202a may be located within an enclosed interior portion 3210 or along an exterior portion of the building 3212. In this manner, the security system 202 may trigger appliances 3202, 3204 located within the interior portion 3210 or exterior portion of the building 3212. As well, the security system 202 itself may be located within the interior portion of the building 300 or along the exterior portion of the building 300. Generally, and regardless of where the security system 202 is located, the security system 202 may be configured to simultaneously trigger appliances located inside the building, while also triggering other appliances located outside of the building 300.

Some embodiments of the security system 202 can be configured to trigger appliances after predetermined period of time has passed. For example, the user may audibly instruct the security system 202 to make a cup of coffee in five minutes. Accordingly, the security system 202 may wait five minutes before transmitting the command to the coffee maker. As well, some embodiments may be configured to determine how long it may take to make the cup of coffee and if the it takes two minutes to make the coffee, the security system 202 may transmit the command to the coffee maker in three minutes, which added together with the two minutes to make the coffee will equal five minutes total. However, this is just one of the many examples, and generally, it should be appreciated that the security system 202 may be configured to trigger any appliance after any amount of time and under any logical circumstances.

In some embodiments the security system 202 may be referred to as a first security system 202. In this manner, some embodiments also include triggering a second security system 202, such as a second light socket camera, to determine if another person is present in a different part of the building 300. For example, the user may instruct the first security system 202 to determine if another person is present in the kitchen. In response to receiving the audible instruction, the first security system 202 may to transmit a command to the second security system 202 to determine whether someone is located within the kitchen. In response to the command, the second security system 202 may use a camera to scan the room and determine whether a person is present. As well, the user may wish to determine the identity of a person that may be present. For example, the audible instruction may further include an instruction to determine an identity of the visitor. In response to determining that the visitor is located within the kitchen, the second security system may determine the identity of the visitor, via any identity detection technology such as facial recognition, iris recognition, retina scanning, smart phone detection, and the like.

Accordingly, the first security system 202 may also be configured to determine the identity of a user or visitor. This technology may be implemented to prevent unauthorized users from activating specific appliances. For example, a parent may restrict a child from watching television. In this manner, the child may not be authorized to watch television at specific hours or at any time of day. In effect, the child may audibly instruct the security system 202 to activate a television. The security system 202 may then determine the identity of the child as being an unauthorized user, and in response to this determination, the security system 202 may not activate the television in conformance with the child's instruction. Alternatively, if an authorized user, such as an adult, were to audibly instruct the security system 202 to activate the television, then upon determining that the adult is in fact an authorized user, the security system 202 may transmit a command to the television to thereby activate the television. It should be appreciated that this feature may be implemented with any desired appliance, such as dangerous appliances, like a power tool.

Figure 33A:
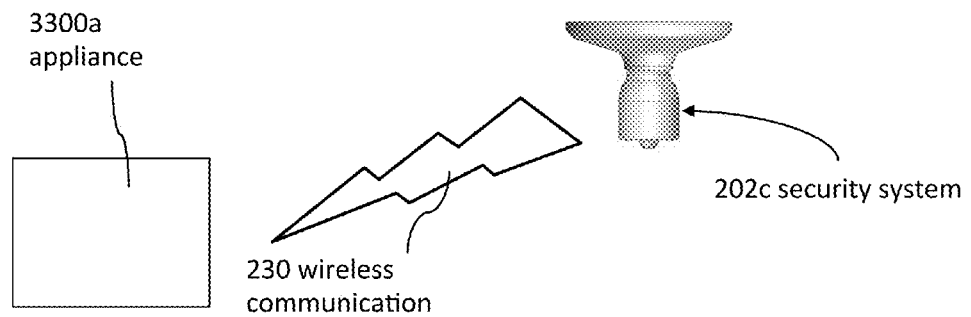
FIGS. 33a and 33b illustrate various embodiments of a security system being connected to an appliance via a wireless connection and a wired connection, according to various embodiments.
Figure 33B:
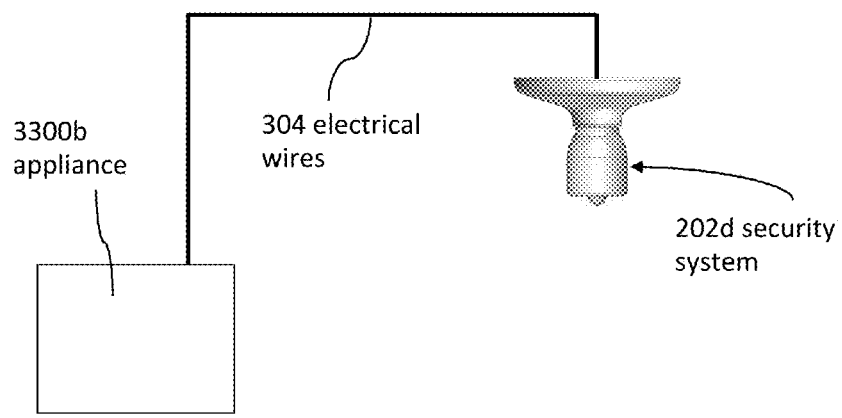

With reference to FIGS. 33a and 33b, the security system 202 may transmit commands to any of the appliances 3300a, 3300b via a wireless 230 or wired connection 304. For example, the security system 202 may use its communication module 262 to wirelessly 230 transmit the command to the selected appliance via one of Wi-Fi, Bluetooth, radio frequency, Near Field Communication, infrared, and any other wireless technology discussed in this disclosure.

As shown in FIG. 33b, security system 202 may use its communication module 262 to transmit the command to the appliance 3300a, 3300b via a wire 304 that is electrically and communicatively coupled to the security system 202. For example, the wired connection may comprise a copper wire located within the building 300. The copper wire may any type of traditional copper used for conducting electricity and WiFi throughout a building 300. However, it should be appreciated that the wired communication any type of wired technology as described in this disclosure, such as Ethernet, telephone, and the like.

In some embodiments the security system 202 may be communicatively coupled, via the Internet, to a remote server. In this manner, the security system 202 may communicate with the remote server to thereby transmit the desired command to the appliance via a media access control address (MAC address). In this manner, the remote server digitally encodes the command and transmits the command to the appliance, whereby the appliance performs the desired operation as audibly instructed by the user. Sometimes the Internet connection may be unavailable and the security system 202 may be unable to communicate with the remote server. Accordingly, the security system 202 may still communicate with the desired appliance by transmitting the command from the security system 202, to a WiFi router, and to the desired appliance. In this regard, the security system 202 is able to communicate to the appliance whether or not an Internet connection exists.

The situation may arise where the security system 202 is not communicatively coupled to the appliance within the building, or when the security system 202 is not electrically coupled to the building 300. In this regard, the security system 202 may perform a check to determine whether connectivity or electricity is available, and in response to determining the security system 202 is not electrically coupled to the building 300 (or communicatively coupled to the appliance), the security system 202 may illuminate a light on the security system 202 to thereby illuminate an area adjacent the light socket camera. The illumination of the light may be performed in response to the audible instruction from the user. However, in some embodiments the light on the security system 202 may automatically be illuminated in response to losing connectivity and/or electricity. This may helpful in the event of a power outage when people are trying to navigate their way around the building 300.

Combinations with Embodiments Incorporated by Reference

The embodiments described herein can be combined with any of the embodiments included in the applications incorporated by reference. In various embodiments, the security systems described herein can include features and methods described in the context of security systems from applications incorporated by reference.

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of using a first light socket surveillance system, wherein the first light socket surveillance system includes an outer housing, a camera coupled to the outer housing, a speaker coupled to the outer housing, a microphone coupled to the outer housing, and a screw thread contact coupled to the outer housing, whereby the screw thread contact is configurable to rotatably attach to a light socket, the method comprising:

detecting an adverse sound with the first light socket surveillance system; and in response to detecting the adverse sound, initiating an event at a second light socket surveillance system communicatively coupled to the first light socket surveillance system.

2. The method of claim 1, wherein initiating the event at the second light socket surveillance system comprises at least one of emitting a sound with a speaker of the second light socket surveillance system and flashing a light of the second light surveillance system.

3. The method of claim 2, wherein in response to initiating the event at the second light socket surveillance system, the method further comprising detecting, by a motion detector of the second light socket surveillance system, a motion within an area of the second light socket surveillance system.

4. The method of claim 3, wherein the event is a first event, and wherein in response to detecting no motion, by the motion detector of the second light socket surveillance system, the method further comprising initiating a second event at a third light socket surveillance system communicatively coupled to the first light socket surveillance system.

5. The method of claim 1, further comprising:
determining a type of the adverse sound; and
emitting a sound with a speaker of the second light socket surveillance system, wherein the sound comprises a message that includes the type of the adverse sound.

6. The method of claim 1, further comprising:
determining whether the adverse sound is a first sound or a second sound;
in response to determining the adverse sound is the first sound, initiating a first event at the second light socket surveillance system; and
in response to determining the adverse sound is the second sound, initiating a second event at the second light socket surveillance system, wherein the second event is different from the first event.

7. The method of claim 6, wherein the first event comprises illuminating a light of the second light socket surveillance system, and wherein the second event comprises emitting a sound with a speaker of the second light socket surveillance system.

8. A method of using a light socket surveillance system, wherein the light socket surveillance system includes an outer housing, a camera coupled to the outer housing, a speaker coupled to the outer housing, a microphone coupled to the outer housing, and a screw thread contact coupled to the outer housing, whereby the screw thread contact is configurable to rotatably attach to a light socket, the method comprising:
determining, by the light socket surveillance system, whether an adverse sound comprises one of a first adverse sound and a second adverse sound;
in response to detecting the adverse sound comprises the first adverse sound, initiating, by the light socket surveillance system, a first event; and
in response to detecting the adverse sound comprises the second adverse sound, initiating, by the light socket surveillance system, a second event.

9. The method of claim 8, wherein initiating the first event comprises at least one of initiating a communication session with a remote computing device and transmitting a notification to the remote computing device.

10. The method of claim 9, wherein the communication session comprises an identification of the first adverse sound, and wherein the notification comprises the identification of the first adverse sound.

11. The method of claim 9, wherein the remote computing device is operated by a homeowner.

12. The method of claim 8, wherein initiating the second event comprises at least one of emitting an audible question with the speaker, initiating a communication session with a remote computing, and initiating a notification to the remote computing device.

13. The method of claim 8, wherein the first adverse sound comprises one of a gunshot and breaking glass, and wherein the second adverse sound comprises one of a scream and a shout.

14. The method of claim 8, wherein initiating the first event comprises at least one of emitting an audible message with a speaker of a light socket surveillance system and flashing a light of the light socket surveillance system.

15. A method of using a light socket surveillance system, wherein the light socket surveillance system includes an outer housing, a camera coupled to the outer housing, a speaker coupled to the outer housing, a microphone coupled to the outer housing, and a screw thread contact coupled to the outer housing, whereby the screw thread contact is configurable to rotatably attach to a light socket, the method comprising:
detecting an adverse sound with the light socket surveillance system; and
in response to detecting the adverse sound, transmitting a notification of a location of the adverse sound to a remote computing device.

16. The method of claim 15, further comprising determining a type of the adverse sound.

17. The method of claim 15, further comprising recording one of audio and video.

18. The method of claim 17, wherein the transmission further comprises at least one of the audio and video.

19. A light socket surveillance system, comprising:
an outer housing;
a camera coupled to the outer housing;
a speaker coupled to the outer housing;
a microphone coupled to the outer housing; and
a screw thread contact coupled to the outer housing, wherein the screw thread contact is configurable to rotatably attach to a light socket,
wherein the light socket surveillance system is configurable to detect an adverse sound, and the light socket surveillance system is further configurable to transmit a notification of a location of the adverse sound to a remote computing device.

20. The light socket surveillance system of claim 19, further comprising a light coupled to the outer housing, wherein the light is configurable to illuminate in response to the light socket surveillance system detecting the adverse sound.

21. The light socket surveillance system of claim 19, wherein the speaker is configurable to emit a sound in response to the light socket surveillance system detecting the adverse sound.

22. The light socket surveillance system of claim 19, wherein the adverse sound is a first adverse sound, and in response to detecting the first adverse sound, the light socket surveillance system is configurable to initiate a first event, and wherein the light socket surveillance system is configurable to detect a second adverse sound, and in response to detecting the second adverse sound, the light socket surveillance system is configurable to initiate a second event.

23. The light socket surveillance system of claim 19, wherein the light socket surveillance system is a first light socket surveillance system, and wherein in response to detecting the adverse, the first light socket surveillance system is configurable to initiate an event at a second light socket surveillance system communicatively coupled to the first light socket surveillance system.

* * * * *